E. H. PALMER & C. T. BERRY.
E. M. & H. V. PALMER & W. H. ROBERTS, EXECUTORS OF E. H. PALMER, DEC'D.
CALCULATING MECHANISM.
APPLICATION FILED NOV. 14, 1908.
1,212,246.
Patented Jan. 16, 1917.
9 SHEETS—SHEET 1.
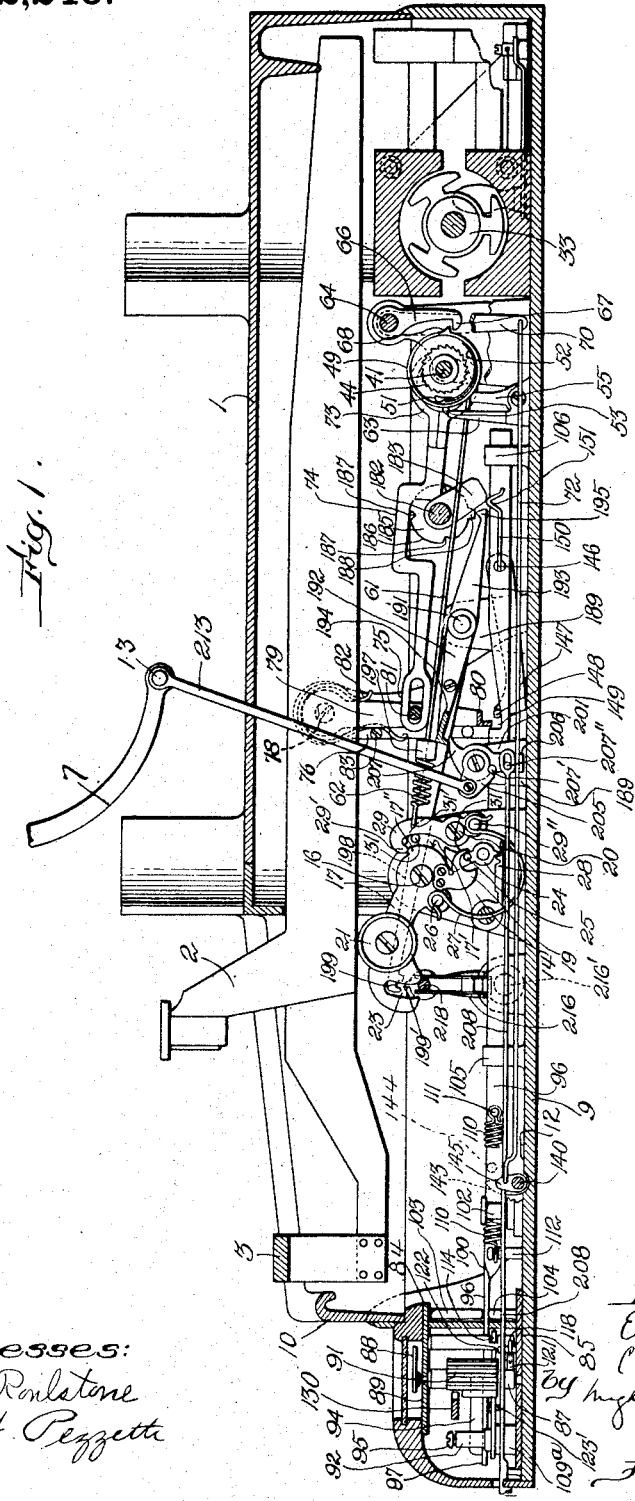

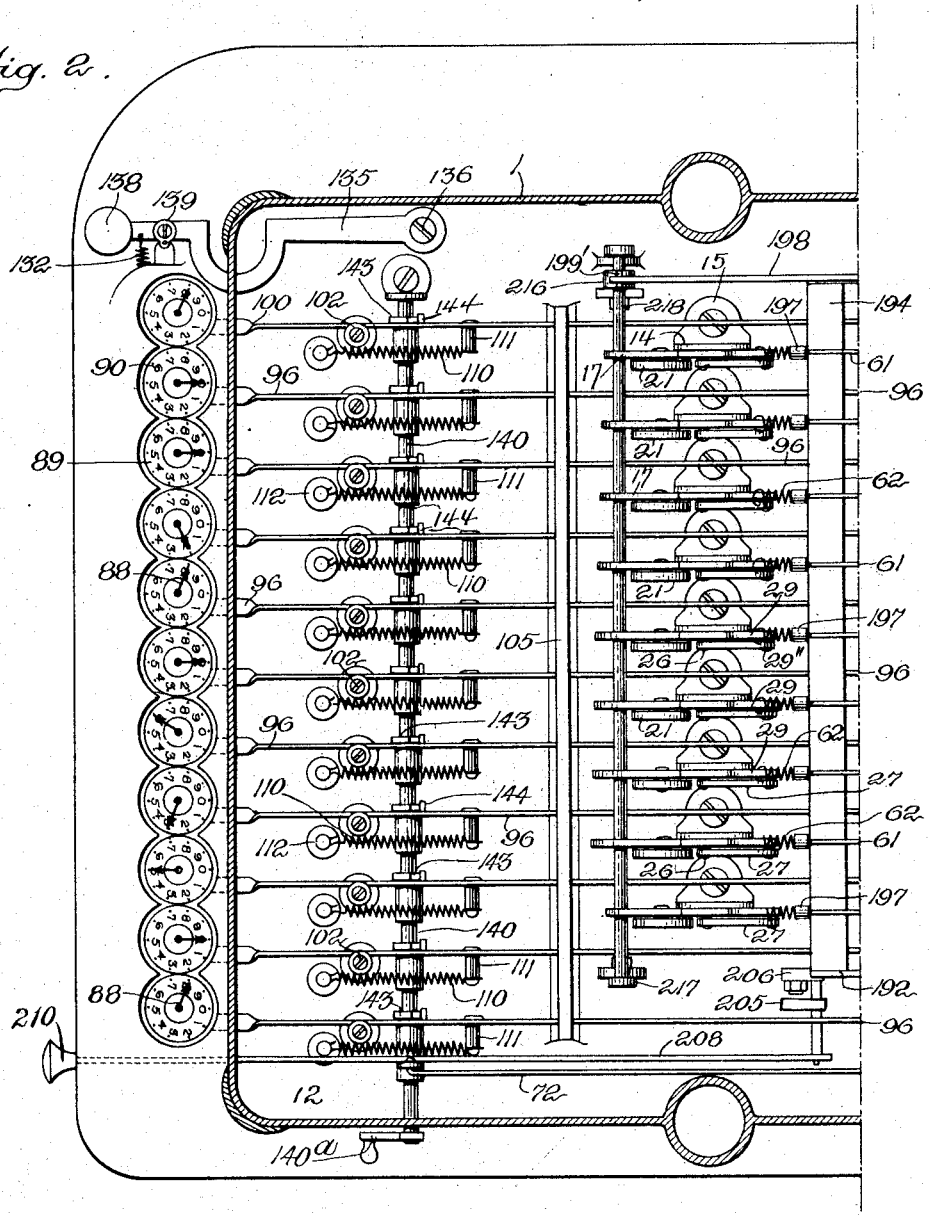

E. H. PALMER & C. T. BERRY.
E. M. & H. V. PALMER & W. H. ROBERTS, EXECUTORS OF E. H. PALMER, DEC'D.
CALCULATING MECHANISM.
APPLICATION FILED NOV. 14, 1908.
1,212,246.
Patented Jan. 16, 1917.
9 SHEETS—SHEET 3.
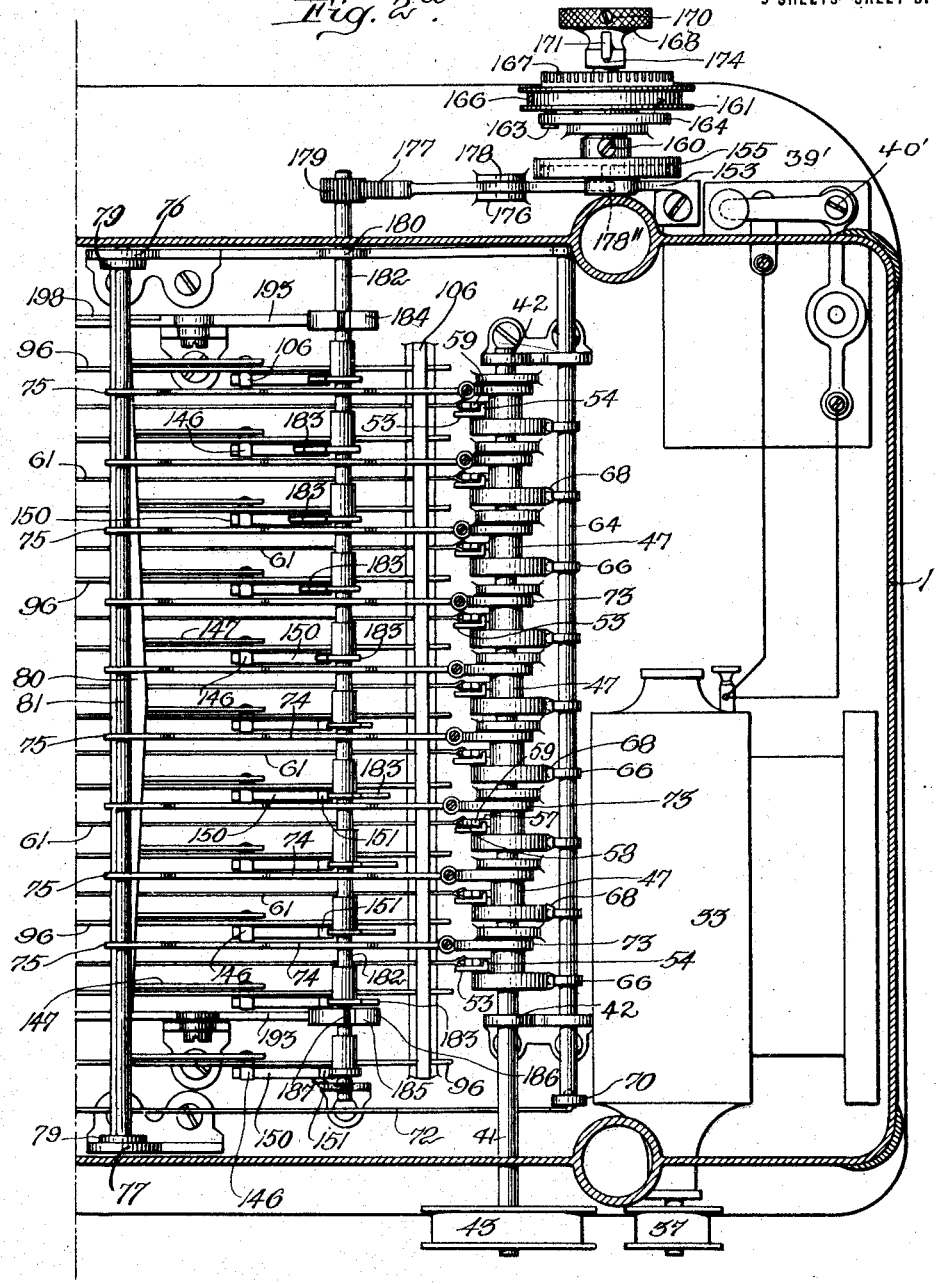
Fig. 2ª
Witnesses:
F. R. Roulstone
P. H. Pezzetti
Inventors
E. H. Palmer
C. T. Berry
by Light Brown Quinby May
Attorneys.

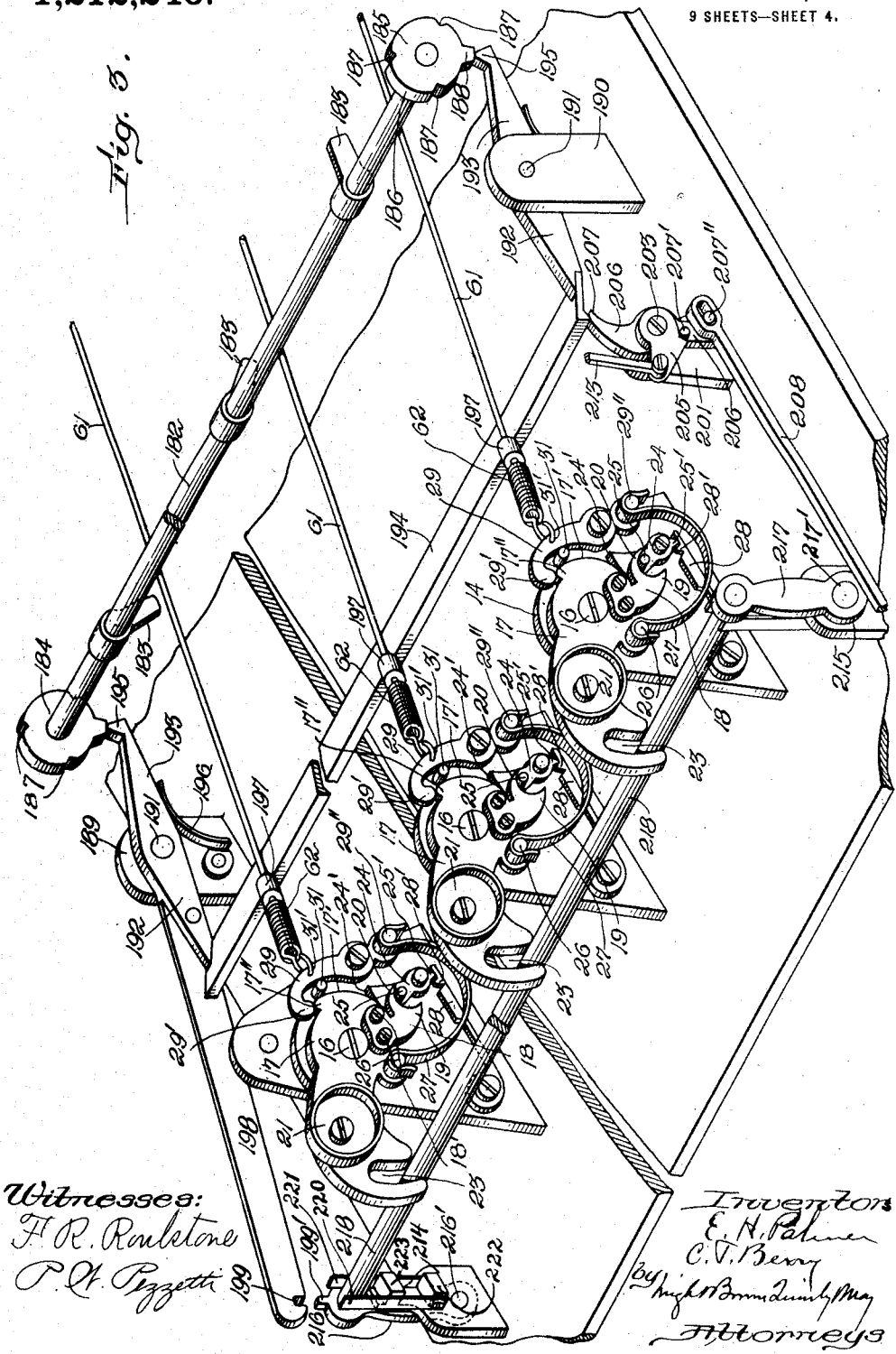

E. H. PALMER & C. T. BERRY.
E. M. & H. V. PALMER & W. H. ROBERTS, EXECUTORS OF E. H. PALMER, DEC'D.
CALCULATING MECHANISM.
APPLICATION FILED NOV. 14, 1908.
1,212,246.
Patented Jan. 16, 1917.
9 SHEETS—SHEET 5.
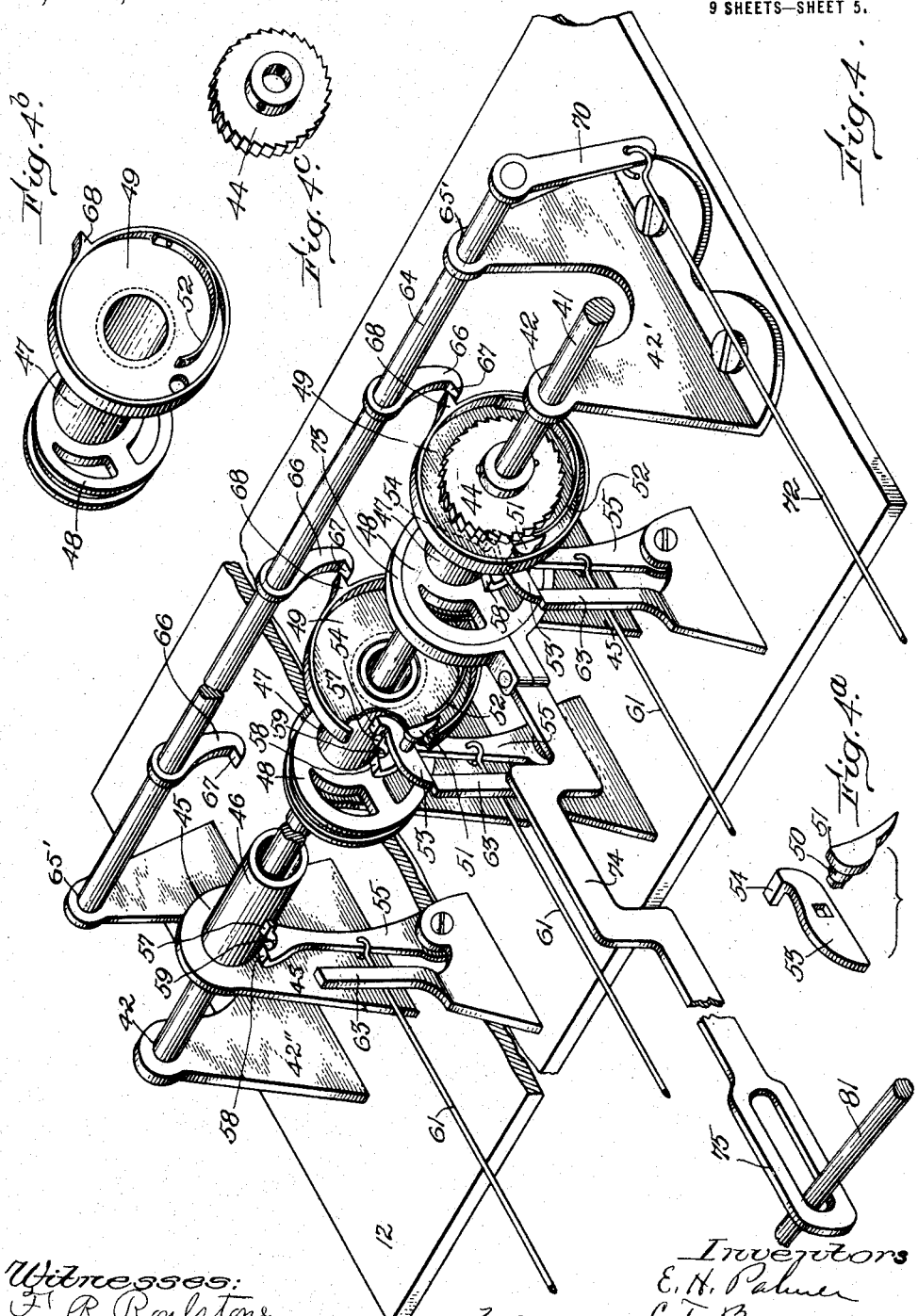

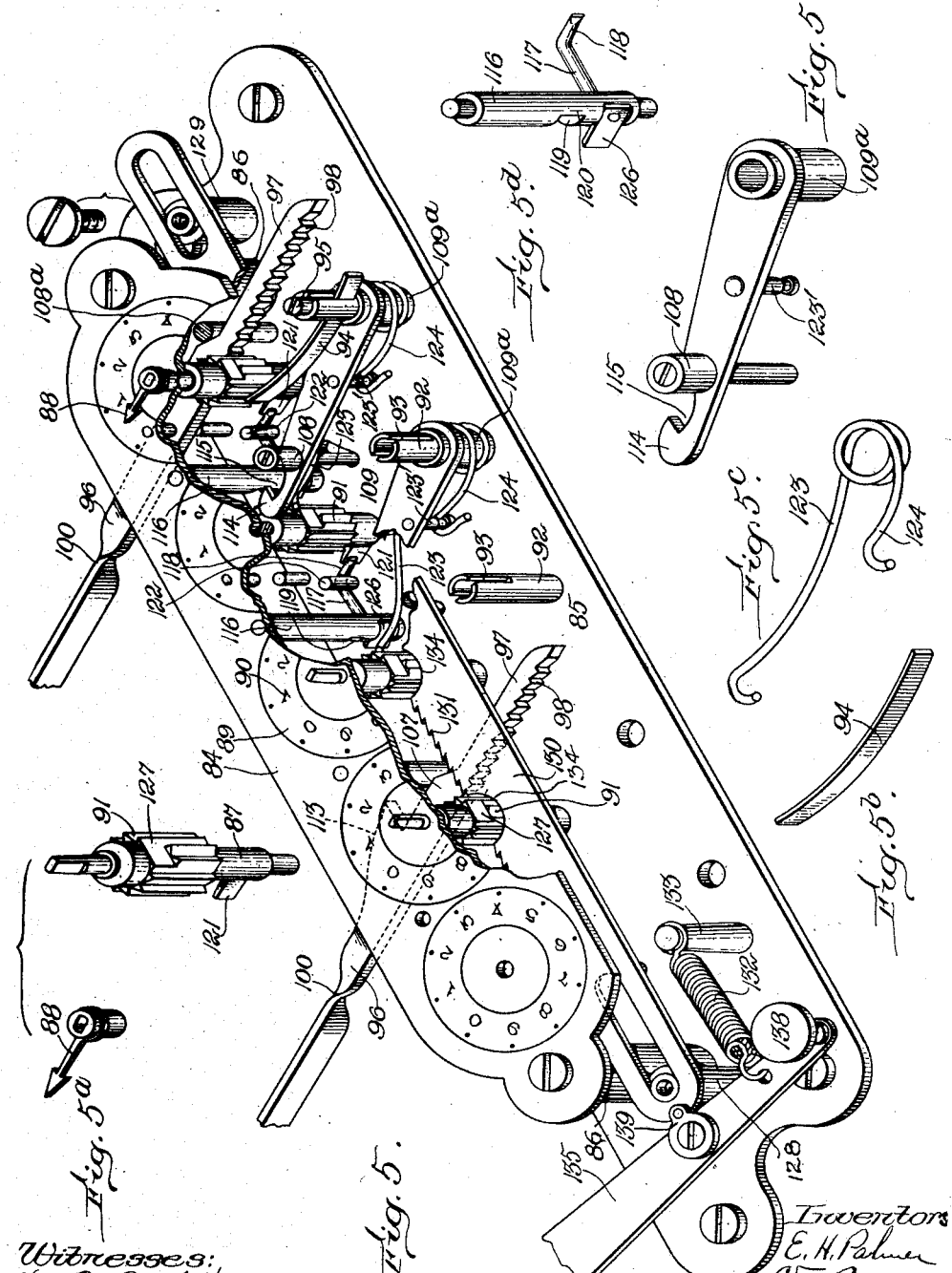

E. H. PALMER & C. T. BERRY.
E. M. & H. V. PALMER & W. H. ROBERTS, EXECUTORS OF E. H. PALMER, DEC'D.
CALCULATING MECHANISM.
APPLICATION FILED NOV. 14, 1908.
1,212,246.
Patented Jan. 16, 1917.
9 SHEETS—SHEET 7.
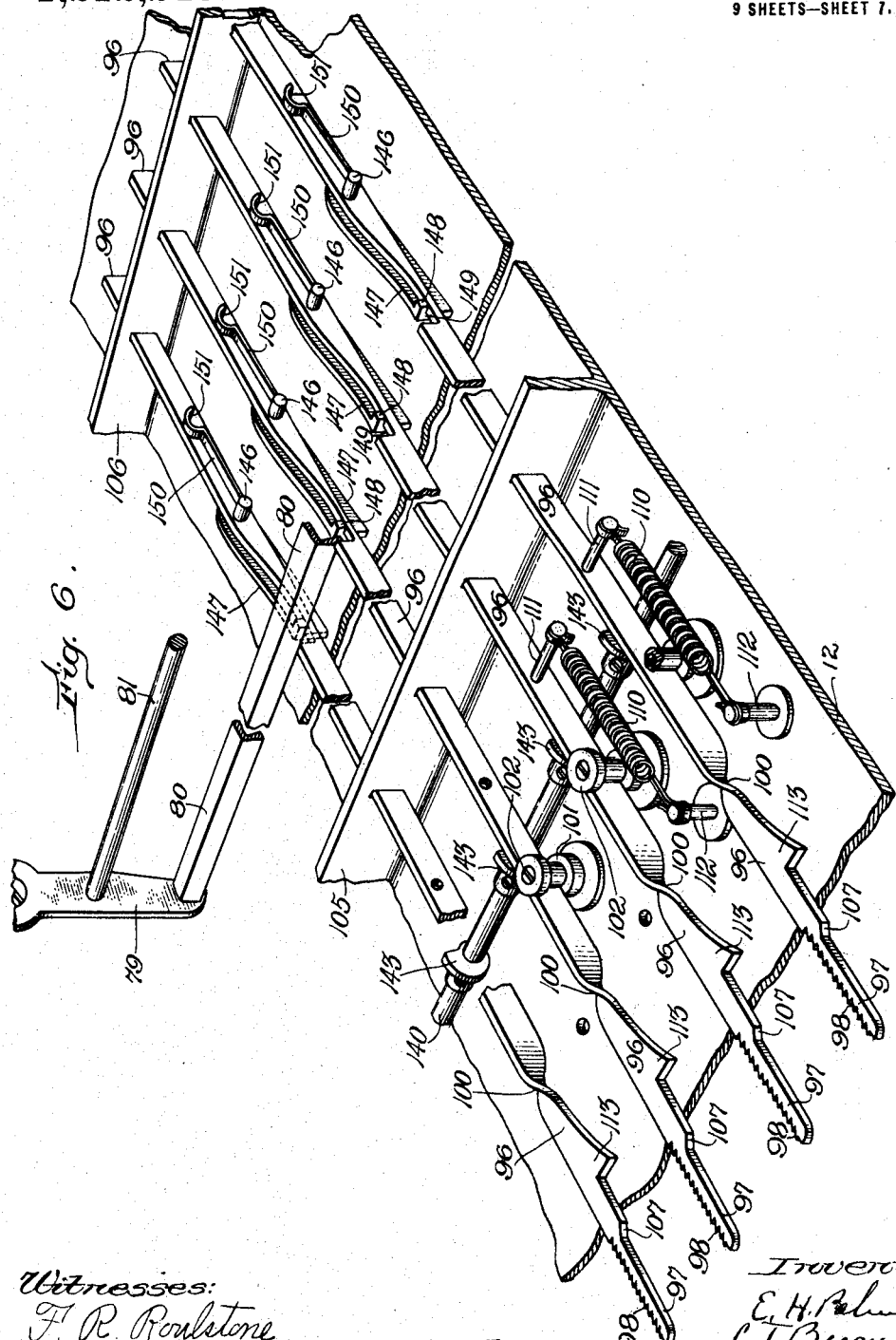

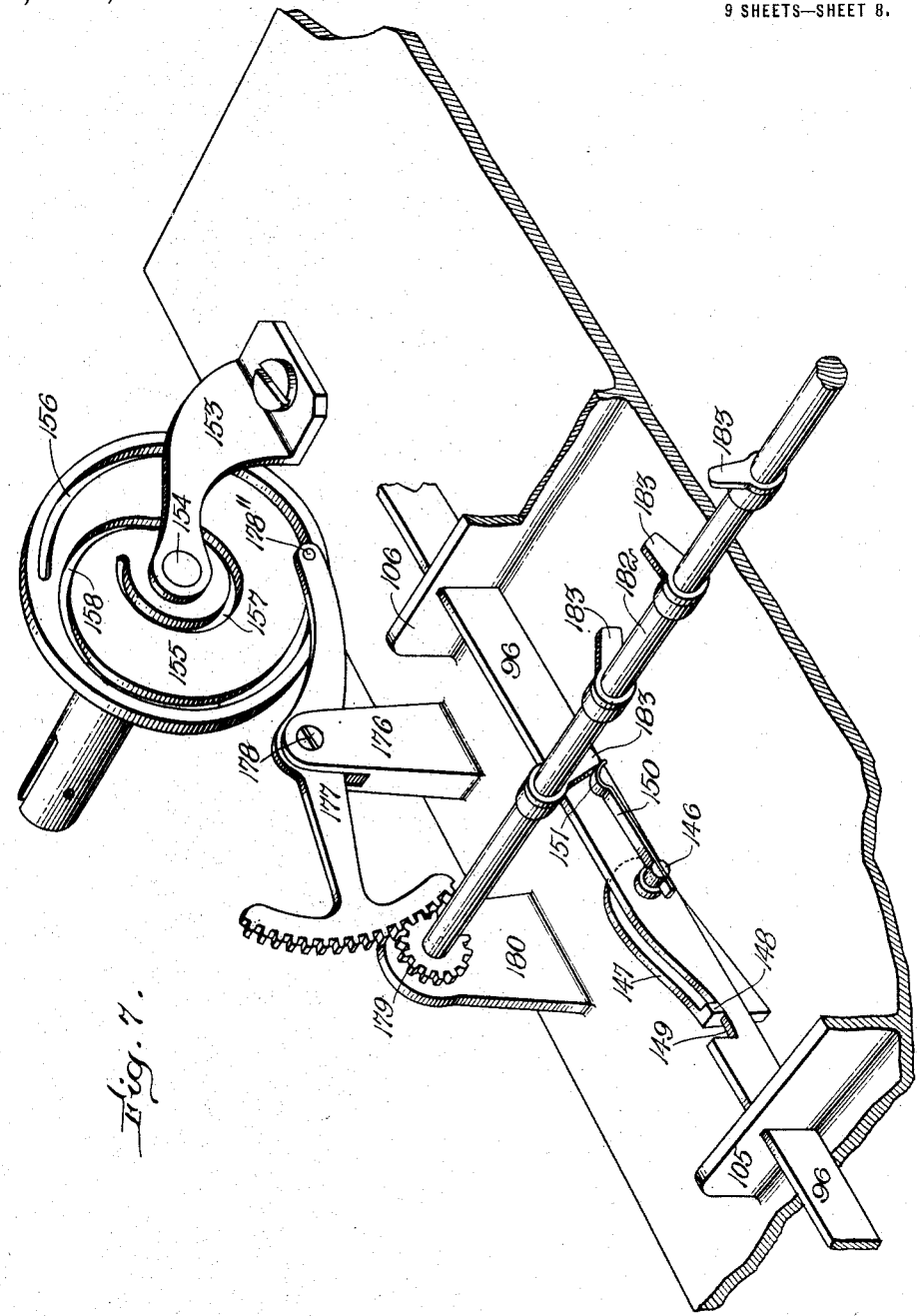

E. H. PALMER & C. T. BERRY.
E. M. & H. V. PALMER & W. H. ROBERTS, EXECUTORS OF E. H. PALMER, DEC'D.
CALCULATING MECHANISM.
APPLICATION FILED NOV. 14, 1908.
1,212,246.
Patented Jan. 16, 1917.
9 SHEETS—SHEET 9.
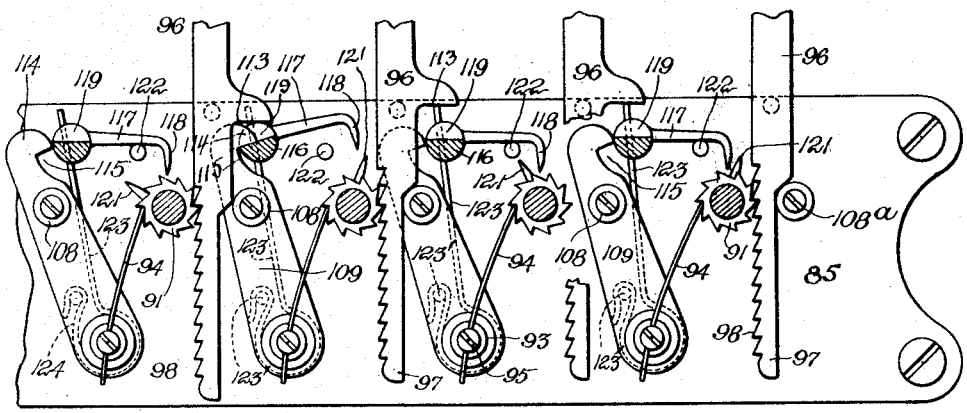
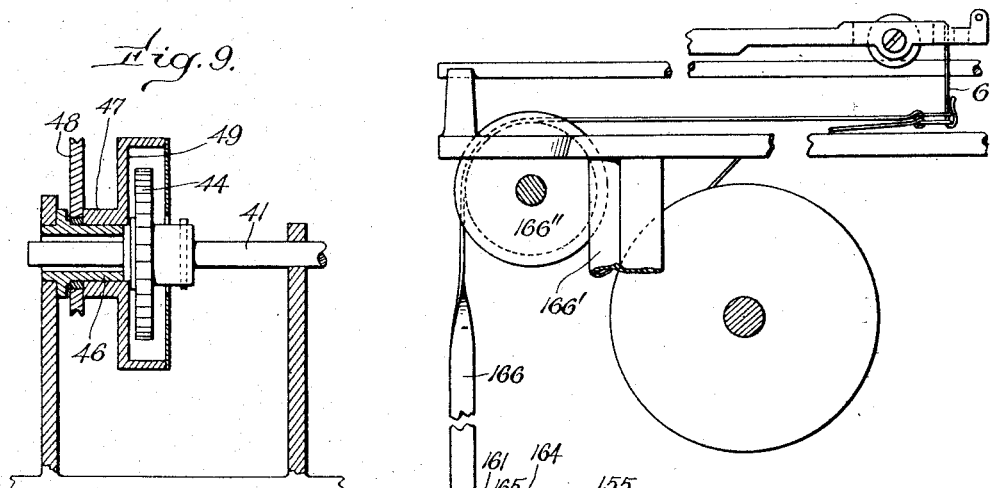
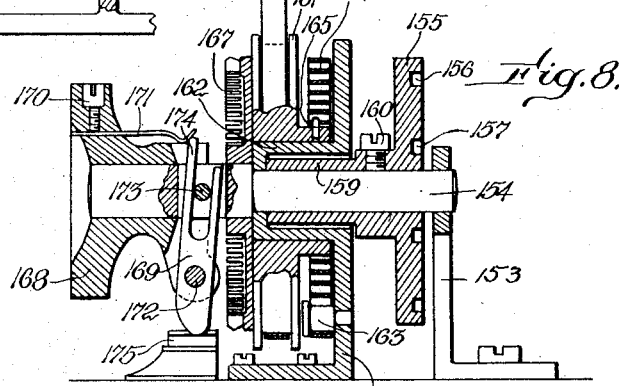

UNITED STATES PATENT OFFICE.

EDWARD H. PALMER, OF READING, AND CLARENCE T. BERRY, OF NEWTON, MASSACHUSETTS; SAID BERRY ASSIGNOR TO SAID PALMER; EMILY M. PALMER AND HAROLD V. PALMER, BOTH OF READING, MASSACHUSETTS, AND WALTER H. ROBERTS, OF MALDEN, MASSACHUSETTS, EXECUTORS OF SAID EDWARD H. PALMER, DECEASED; SAID EXECUTORS ASSIGNORS TO EMILY M. PALMER AND HAROLD V. PALMER, INDIVIDUALLY.

CALCULATING MECHANISM.

1,212,246.  Specification of Letters Patent.  Patented Jan. 16, 1917.

Application filed November 14, 1908. Serial No. 462,584.

*To all whom it may concern:*

Be it known that we, EDWARD H. PALMER and CLARENCE T. BERRY, of Reading and Newton, respectively, both in the county of Middlesex and State of Massachusetts, have invented certain new and useful Improvements in Calculating Mechanisms, of which the following is a specification.

This invention relates to calculating apparatus capable of being used in connection with a typewriting machine, and consists in a mechanism or set of mechanisms mounted upon a base separate from the typewriting machine itself but adapted to be engaged or connected in a certain relation with any typewriting machine so that actuating the number key levers of the typewriter will cause the calculating mechanisms to be operated so as to show sums or other final results.

The apparatus is designed to give as little additional work to the typewriter operator as possible, and hence it is provided with its own driving means which supplies the actual power used to effect the calculations, this power being merely controlled and put into operation by the actuation of the number keys or the release elements of the calculating apparatus which are engaged and governed by such keys. Thus the only power which must be expended by the operator, additional to that necessary for the operation of the typewriting machine itself, is simply enough to release the detents which prevent the automatic driver from operating the calculating mechanism so as to permit such driver or drivers to become operative.

The object of this invention is to provide a mechanism which may be readily and easily brought in contact with any of the various typewriting machines, and as readily removed therefrom, which will actually and correctly record the totalization of such expressed in figures, as may be typewritten by an operator on a typewriting machine.

Further objects are to provide accuracy with speed beyond the requirements of skilful operators, together with an expenditure of manual effort that is inappreciable; simple construction that may provide its own adjustments, and that its several parts be readily removable and readily replaced, by persons of ordinary skill; to provide a mechanism which will record results of large amounts, its mechanism providing means for indicating a sum in billions, as readily as in dollars and cents; and to provide a mechanism having the least actual mechanical connection with a typewriting machine, easily detached therefrom, and operable with the typewriting machines already in daily use without any structural change, and applicable with slight modification to be used separately as an adding machine, so called.

The arrangement, mechanism action and means whereby these objects are accomplished are fully set forth in the following specification, with reference to the accompanying drawings, in which the same reference characters indicate the same parts in all the figures.

Figure 1 represents a longitudinal sectional elevation of a calculating apparatus containing the principles of my invention, together with the lower part of a standard typewriting machine shown as being placed in operative relation with the calculating apparatus. Figs. 2 and 2$^a$ show in plan view respectively the forward and rear halves of the calculating apparatus embodying my invention with the base frame of the superposed typewriting machine shown in section. Fig. 3 represents an isometric view of the parts which are directly operated by the key levers of the typewriting machine to permit connection of the power driving devices with the calculating mechanisms and indicators, this view showing also means for rendering such parts inoperative. Fig. 4 represents an isometric view of the power-driven actuating shaft and some of the eccentric driving elements and their connections, which eccentrics are detachably connected with the shaft and rotated when a calculation is to be effected. Figs. 4$^a$, 4$^b$ and 4ᶜ represent detached views of elements of the driving mechanisms shown in Fig. 4. Fig. 5 represents an isometric view of the result indicators, the primary actuators therefor, the means by which carrying of tens is effected, and the device by which the indicators are re-set at zero when a calculation is completed. Figs. 5ᵃ, 5ᵇ, 5ᶜ, 5ᵈ and 5ᵉ represent detail views of the several parts which are shown assembled in Fig. 5. Fig. 6 represents an isometric view of a number of the actuator bars by which the result indicators are directly moved, this figure showing also a part of the driver which imparts the necessary motion to these bars and the trips or pawls by which the bars are selectively connected with said driver. Fig. 7 represents an isometric view of the selectors by which the actuating bars shown in the preceding figure are successively put into connection with the common driver therefor, together with the cam means operated under the control of the carriage for operating these selectors. Fig. 8 represents a sectional elevation showing the cam illustrated in the preceding figure, the driving means therefor, and the connection through which the latter is controlled by the typewriter carriage. Fig. 9 represents a sectional elevation of the driving mechanism shown in Fig. 4. Fig. 10 represents a plan view illustrating the result indicators and the associated parts shown in Fig. 5.

1 represents the frame of a Remington typewriting machine, broken away to show its own working parts, together with the several working parts of the adding attachment mechanism (which hereafter will be referred to as "the mechanism") designed to tabulate the added sum of figures typewritten by an operator. 2 represents a key lever of the typewriting machine operating one of the numeral type bars, 3 a spacing bar, 4 the upper frame and 5 the upper table.

6 (Fig. 8) represents a hook fixed to the carriage of the machine to which the steel tape or ribbon is attached.

7 (Fig. 1) is a curved arm projecting downward, moving when the shift key is depressed to write capitals or upper case characters.

9 is an inclosed base of the mechanism on which the front 10 and back frame 11 of the typewriting machine rest, thereby raising it about one half inch from its normal position.

12 is the upper surface of the base 9 to which the several members of the mechanism are attached.

13 represents the attachment of the vertical arm 213 of the mechanism to the curved arm 7 of the typewriting machine.

14 (Figs. 1, 2 and 3) is an upright support provided for carrying the members of the mechanism. It has a flanged horizontal projection 15 by which it is firmly fixed to the surface 12.

17 is a vertical movable member pivotally mounted on screw pin 16 fixed in the side of support 14. It has a forwardly projecting arm near the front end of which is pivotally mounted a friction-reducing flanged disk 21 so positioned that its peripheral face forms a detachable contact with the under side of the typewriting machine number key lever 2. (Fig. 1). At the forward end of the projecting arm 17 there is formed a curved slot 23 capable, upon its depression, of embracing a transverse rod 218. At its rear end the rocking member 17 near its top part has a slight toothlike projection 17″, and back and below this projection its form is a concentric face 17′ concentric with its pivotal mounting 16. Directly below said mounting, member 17 also carries firmly fixed to its side by screw and pin 18′, an offset or projecting part 18 having a circular slot or opening cut away at its lower part, thereby forming two claw-shaped arms 19 and 20. These arms embrace pin 25 projecting from rocking member 24.

Pivotally mounted on the side of upright support 14, at 24″, at a point below the claw-shaped arms, is a rocking member 24, sometimes called "a lazy dog." It extends upward, back of, and out of contact with arm 18, its upper face being formed in a slight eccentric 24′ calculated to form a slight frictional contact with the concentric face part 17′, during such time as it occupies its indicated position, thereby permitting the rear end of member 17 to rock upward, but to immediately lock it from any rocking downward until such time as a full downward stroke of the key lever of the typewriting machine has been made, causing the type bar to imprint the selected number by full contact with paper on the platen roll. When the full downward stroke is completed, the curved arm 19 contacts with the projecting pin 25, thereby rocking member 24, and its eccentric face 24′ out of contact with face 17′, causing a V-shaped projection 25′ at its bottom part to slip over notch point 28′ in bar spring 28, also fixed to the side of support 14, thus holding lazy dog 24 out of action, permitting member 17 to resume its normal position, and in doing so, claw-arm 20 contacting with pin 25, rocks lazy dog 24 back into action. This mechanism is provided to prevent the slight downward motion of a number key, causing a slight movement of member 17, and thereby through release arm 29 and link 61, causing the release of an eccentric and totalizing its value any number of times, without printing a corresponding number, thus preventing an apparent incorrect result. Member 17 also carries a projecting stud 26 as a support for one end loop of a curved expansive spring 27, its other looped end being carried by stud 29″ projecting from the lower part of release arm 29.

Bar spring 28, its left-hand end fixed to support 14, extending to the right, is provided with a pointed tooth 28′ to hold lazy dog 24 in its operative or inoperative position, by means of its V-point being held on alternate sides when rocked by arms 19 and 20.

Pivotally mounted on upright support 14 at 30, is an upright rocking release arm 29. Its upper end is formed in a forward and downward curved point 29′ designed to contact with projection 17″ and to continue in contact with face 17′ during upward motion of the latter. The arm 29 provides a pivotal mounting 31′ for spring 62, and thereby connects it with link 61, which extends backward to the release arm 55, (Fig. 4) and thus the slight backward motion of arm 29 causes the actuation of one of the eccentrics, proportioned to the value of the number key depressed, as will later be described. A stop 31 projecting from the face of support 14 limits forward motion of arm 29.

At the rear of the mechanism is a small, shuttle-wound electric motor 32 (Fig. 2a) supported by suitable bearings which are fixed to base surface 12, said motor having an armature 33 (Fig. 1) and field magnets to be electrically excited by electric current. On its outward end the armature shaft carries a driving pulley 37, (Fig. 2a).

From upper and lower binding posts connecting wires run to a switch mechanism having a switch arm 39′ for closing the circuit, pivotally mounted at 40′. All of these parts are mounted on suitable insulation.

A transverse shaft 41 (Figs. 1, 2a, and 4 and 9) mounted in journal bearings 42 is supported by upright supports 42′ and 42″. At its outward end it carries a pulley 43 to be driven by a belt from pulley 37. On this shaft 41 are fixedly mounted nine ratchet toothed wheels 44, situated on said shaft 41 in relation to the several number keys of the typewriting mechine.

An upright support 45 firmly fixed to the surface plate 12 is situated at the left of each of the ratchet wheels 44. It has a horizontally projecting cylindrical sleeve 46 with exterior bearings (out of contact with shaft 41 which passes through its center) for the purpose of carrying the several loosely mounted members 47 of which there are nine.

Referring to Figs. 4, 4a, 4b and 4c, on the cylindrical sleeve 46 is loosely mounted a cylindrical member 47, on the left of which is mounted an eccentric 48. On its right is mounted a recessed flanged disk 49, the recess of which provides for a space for the ratchet wheels 44. To connect the ratchet wheels 44 with the cylindrical member 47, a pivot 50 passes through the vertical part of the flanged disk 49 at a point horizontally forward of the center of its bearing, said pivot having at its right-hand end a pawl 51 firmly fixed thereon. Attached to the inner face of the peripheral face of the disk 49 is a spring 52 bearing against the pawl 51, its force being directed to throw said pawl 51 into contact with ratchet wheel 44.

On the left-hand end of pivot 50 is a fixed arm 53 whose front end projects forward beyond the periphery of flange 49. Projecting to the left from its rear arm, it has a transverse projection 54. An upright rocking arm 55 pivotally mounted to the lower part of post 63, fixed to the base surface 12, carries at its upper end, projecting to the right, two angular faced horizontal bearings or pallets 57 and 58. Between bearings 57 58 is an opening 59 to allow the projection or stud 54 to pass between them.

Pivotally connected to the rocking arm 55 is a link or rod 61 extending forward to release arm 29. This rod or link 61 is provided with a spiral spring part 62, (Fig. 3) in order that its rear motion may be restrained when desired. An upright post 63 fixed in base surface 12 is situated directly in front and in the same plane as arm 53. It extends upward to meet arm 53 in its tangent position, while the rear end of arm 53 is normally supported by its projecting stud 54 resting on a horizontal bearing 57.

A horizontal transverse shaft 64 at the rear of the nine eccentrics on shaft 41 is journaled, for rocking motion, at its ends in supports 65 and 65′ near the bottom line of the typewriting machine frame.

Rigidly fixed to shaft 64 and projecting downward are nine arms 66 one opposite the peripheral face of each flange 49. On its front edge it has a wedge-shaped projection 67 inclined forward. Projecting from the peripheral face of the flange of disk 49 is a ratchet tooth or wedge-shaped projection 68. It is situated diametrically opposite the pivot 50 in the disk 49. In its normal position with the cylindrical member 47 at rest, its position is slightly above the wedge-shaped projection 67 on the rocking arm 66.

At the outward end of rocking shaft 64 is a fixed, downwardly projecting arm 70 to the extreme lower end of which is pivotally connected a link 72. The eccentrics 48 are furnished with eccentric straps 73 and connecting eccentric rods 74 pass forward and have looped forward ends 75, surrounding the cylindrical rod 81.

Within the typewriting machine, between its side frames and its key levers, are two vertical supports 76 and 77 (Fig. 2a) firmly fixed in base surface 12. Suspended from the top of each support 76 and 77 by pivotal connections 78 and 78′, and extending downward nearly to the base surface 12, are two side arms 79 (Figs. 1 and 6) connected at their lower ends by an angular bar 80 extending across the mechanism, firmly fastened therein to insure equal angular motion. Midway between the angular bar 80 and the point of suspension the side arms 79 are also connected with a cylindrical rod 81 for communicating a rocking motion to the compound bar, through the rotary motion of the several eccentrics 48 (there being nine in number, all different in eccentricity and therefore in degree of motion, from one to nine proportional parts) by either one of the eccentric straps 73 and the eccentric rods 74, through its slotted end 75 surrounding the cylindrical rod 81.

Two springs 82 attached to the two arms 79 keep the compound vibrating bar 80 forward in its normal position against the two stops 83 fixed in upright supports 76 and 77.

At the front of the mechanism, below the front of the typewriting machine and extending across the mechanism from side to side, is a framed member fixed in its position to base surface 12, consisting of an upper plate 84, and lower plate 85, (Figs. 1 and 5) the upper plate 84 being supported by upright posts 86 fixed in and upwardly projecting from plate 85. Between these plates, at equal distances, are eleven (permissibly more or less) vertical spindles 87, the lower ends of which are pivotally mounted in journal bearings in lower plate 85, and their upper ends being journaled and passing up through plate 84. Their extreme upper ends are square, and at this point a small indicating hand 88 is fixed to each. Details of the mechanism shown in Fig. 5 are also shown in Figs. 5ª, 5ᵇ, 5ᶜ, 5ᵈ and 5ᵉ.

Under the hand 88 on the upper surface of plate 84 (the upright spindle 87, forming its center), is engraved a circular dial 89, surrounded at equal distance by the numerals 90 from zero to nine,—ten numbers in all. The indicating hand 88 rotates with vertical spindle 87 and points successively to the numbers 90. The central portion of the vertical spindle 87 is formed of an upright ratchet pinion 91 having ten ratchet teeth. Situated in front, and slightly to the left of each vertical spindle 87, projecting upward and firmly fixed in plate 85, is an upright stud 92, the upper part of which is slotted at 93, said slot being in such direction that a short, flexible steel spring 94 held rigidly in its position by a set screw 95, in the top of stud 92 may project backward at an angle, that its rear end may, by the force of its own spring, enter one of the ratchet teeth 91 of the vertical spindle 87, thereby affording a restraining pawl to prevent any rotary motion of the vertical spindle except in one direction.

Directly to the right of each vertical spindle 87 is an actuating bar 96 formed of a thin, flexible, flat, steel bar, provided with a series of ratchet teeth 98 cut upon its lefthand forward edge, engaging with the ratchet teeth 91 of the vertical spindle 87, to rotate the vertical spindle in one direction only. Its forward end 97 passes forward beyond the front of the horizontal plates 84 and 85 and extends over and parallel to the surface plate 12 to the rear end of the mechanism, these bars being under all the other members except a bar for a resetting motion, which will be hereinafter explained. At their front ends 97 their surface width is horizontal. Just back of the vertical spindle, this actuating bar is formed in one quarter turn 100, thereby making their width surface back to this point vertical. These bars are designed for rapid reciprocal movement backward and forward. Near their forward ends and back of the quarter turn, they are supported by small flanged wheels 101, (Fig. 6) said wheels being loosely mounted on vertical pins 102 fixed in surface plate 12, projecting upward therefrom. These flanged wheels are placed slightly to the left of a direct backward line, thereby causing the thin actuating bars, through their natural spring force, to press to the left against the right-hand sides of the vertical spindles, thus making a firm but yielding connection between the ratchet teeth on the edge of each bar, and those on the vertical spindle, and permitting the actuating bar to be drawn backward a predetermined distance, the contacting teeth slipping by each other, but to engage upon its forward movement, thereby turning the vertical spindle together with its indicating hand a proportional number of teeth as the indication requires. Projecting downward from plate 84 and upward from plate 85, directly over and under the flat forward portion of the actuating bar 96, are two short studs 103 and 104, (Fig. 1) their ends coming near the surfaces but not contacting with the actuating bar, designed as guides to prevent displacement, and permitting the ready removal of said bar when desired.

In order to maintain its position and guide its reciprocating motion, the actuating bar passes through two slots, the forward one being cut in horizontal bar 105, and the rear slot cut in horizontal bar 106, both of which are firmly fixed to surface plate 12. The right-hand edge of the actuating bar on the opposite side from the toothed section and almost opposite the vertical spindle 87, when it finishes its forward movement, is formed as a wedge 107, its face being at an angle of forty-five degrees with its parallel sides, so formed that at the end of its forward motion, it may contact with upright pin 108 (Figs. 5 and 8)

fixed in a movable arm 109, said arm being pivotally mounted on the lower end of upright stud 92, its downward projecting sleeve 109ᵃ resting on plate 85. The contact of the wedge-shaped part 107 with upright pin 108 deflects it at the end of its forward motion to the left, and being permitted by its inherent resilience, presses its ratchet teeth 96 in close contact with the ratchet teeth of the vertical spindle 87, thereby limiting the rotary motion of said spindle, and locking it in position, thereby preventing any over motion when drawn backward and suddenly released, produced by the forward force of spiral springs 110 (Fig. 6) attached to horizontal pin 111 projecting from its side, and anchored in stud 112 which is fixed in surface plate 12. On the right-hand edge of said actuating bar, in the rear of the angular form described, is a further projection 113, (Figs. 6 and 10) forming an edged arm, its direction being right-angular with the parallel sides of the bar and with its movement, the back of said projection being reduced to the normal width of the remaining portion of the bar.

The rear portion of the movable arm 109 is formed with a hook-like point 114 at its right-hand side, and between this point and its upright stop pin 108 is a recess 115. At the right of point 114 is an upright rotary stop 116 movable and journaled in plates 84 and 85. At its extreme lower end projecting horizontally to the right, is fixed an arm 117, (Figs. 5ᵈ and 10) the end of which 118 is turned forward, pointing toward the center of the vertical spindle next to its right. The horizontal plane of movement of arm 109 is slightly above the upper face of plate 85. Directly opposite the point 114 of arm 109 a slot or narrow segment 119 is cut horizontally half-way through upright rotary stop 116, said slot being of sufficient depth that the point 114 of the movable arm 109 may enter when upright rotary stop 116 is rotated to the left or toward it. The uncut or peripheral face 120 in front of slot 119 prevents the point 114 from entering the slot until the rotary stud 116 is so turned.

At the lower part of the vertical spindle 87 near the surface of plate 85 is fixed a projecting tooth 121 so situated that once in each rotation of said spindle this tooth projection contacts with the bent end 118 of fixed arm 117, thus slightly rocking the rotary stop 116 toward the point 114 of arm 109, permitting the point to enter slot 119, its object being, as arm 109 moves to the right, to carry with it upright stop pin 108, thereby releasing the lock, caused by angular portion 107 of actuating bar 96 contacting normally with it, moving stop pin 108 out of the line of forward movement of the actuating bar, and allowing said bar to move forward the distance of one ratchet tooth, in order to rotate the next left-hand vertical spindle one tooth and thus move its indicating hand one point to its next higher number. Any more than this limited amount of forward movement of the actuating bar is prevented by projection 113 contacting with the upright movable stop 116. The additional indicated number is thus effected on the dial next to the left of any recording indicating spindle and hand during the operation of registering the added sum of a typewritten number, in other words, effecting a spring carrying motion of the tens to the indicator of the column of next higher denomination at the time when any operative indicating hand reaches or passes by the figure "0."

At the left-hand side of the extreme lower end of rotary stop 116, (Figs. 5 and 5ᵈ) diametrically opposite the fixed arm 117, a recess or narrow segment, similar to slot 119, is cut horizontally part way through rotary stop 116, a plate 126 fixed in said recess presenting a chord face for the contact of the side of a backward projecting arm of a spring 123. The arm 117 is held against upright pin 122 fixed in plate 85 by force of spring 123 contacting with chord surface plate 126.

The spring 123 is formed so that its forward looped end 124 embraces a downwardly projecting support 123' from the under side of arm 109 fixed in said arm at a point to the left and slightly back of stud 92. Thence it passes around and in front of stud 92, and continues in a longer arm projecting backward and in contact with the chord face of plate 126 of rotary stop 116. Its force is expansive and its operation is two-fold: first, to normally move the arm 109 and stop pin 108 to the left, thereby permitting the locking of the teeth of the actuating bar to the teeth of the vertical pinion 91; and second, by the expansive force of its back projecting arm 125 contacting with chord plate 126 of rotary stop 116, to turn said rotary stop to the right, bringing its curved arm 117 to its normal position against stop pin 122, and in the position of contact with projecting tooth 121 at the lower part of vertical spindle 87 to be operated thereby. The normal action of this spring is to keep the stop pin 108 against the actuating bar, thus preventing any further forward motion than its normal position permits, and its force is also directed to restore these conditions whenever they are disturbed. The further forward motion of the actuating bar to carry one count to the indicator next to the left of the indicator in actuation is produced by the forward force of spring 110 individual to each of the actuating bars, said spring being enough more forceful than spring 123 to overcome its initial expanding force.

At the extreme top of the ratchet part 98 on vertical spindle 87 a small portion of the ratchet teeth is cut away, leaving a plane surface 127 as a chord of a circle (a segment having been removed) and the position of this chord is transversely in front of the vertical spindle when the point of the indicating hand is pointing to the rear or at the numeral "0" on the dial.

Slidingly mounted in two upright supports 128 and 129 which are fixed in plate 85 is mounted a reciprocally moving, transverse, resetting bar 130, passing in front of the chord plane surfaces 127 of the vertical spindles 87. Its inner or back edge is provided with ratchet teeth 131 pointing to the left, their pitch line being the same as or tangent to that of the ratchet teeth of the vertical spindle, and in one half of its reciprocating movement, or moving from right to left, it rotates all of the ratchet vertical spindles 87 until the chord face parts 127, made by the partial removal of the teeth in the vertical spindle, is parallel to the resetting bar 130. The ratchet teeth 131 of the resetting bar having no further contact with the ratchet teeth 98 of the vertical spindle 87, it remains motionless during any further reciprocating motion of the resetting bar, and its position rotarily is such that all of the indicating hands 88 point to the numeral "0," thereby resetting all the indicators at the zero point.

A spiral spring 132 connecting with the resetting bar at its right-hand end and anchored to a stud 113, holds the resetting bar normally in its right-hand position. Directly in front of each of the vertical spindles 87, when the resetting bar is in a position of rest, a segmental recess 134 is cut away from its contacting edge, thus permitting the vertical spindle 87 to rotate freely during the inaction of the bar. For the reciprocal movement of the resetting bar 130 to the left, a lever 135 is provided, fulcrumed at 136 (Fig. 2), said lever 135 having a handle 138 projecting forward for manual operation. Said lever is connected with the resetting bar 130 by a pivotal link 139.

Just back of the one-quarter turn 100 of the actuating bar 96 (see Figs. 1, 2 and 6) a small horizontal shaft 140 extending across the mechanism is journaled in two upright bearings fixed to the surface plate 12. It is provided with short, radial projecting, flat arms 143 which in their normal position incline toward the front of the mechanism. The contacting rear face of these arms is normally within one tooth space of contact with pin 144, projecting to the right from actuating bar 96 to allow a forward motion of the actuating bar for the purpose of carrying tens when it is released and moves one tooth space forward. On the extreme right-hand end of shaft 140 is fixedly mounted an upright crank arm 145. This upright crank arm 145 is connected with the downwardly projecting arm 70 on rocking shaft 64 by link rod 72, the front end of said rod being passed through a hole in crank arm 145.

As already shown, the revolution of any of the eccentrics and connected flanges 49, by its wedge-shaped projection 68 contacting with ratchet tooth projection 67 fixed in arm 66, causes shaft 64 and arm 70 to rock backward, thereby communicating a backward motion, through link rod 72, to upright crank arm 145, and as this motion is obtained at the end of the revolution of the flange pinion 49, the upright radial arms 143 on horizontal shaft 140 are also rocked backward, contacting with such horizontal pins 144 in any of the actuating bars 96 as may have been released and moved forward in the course of typewriting a line of numerals, in order to carry the tens, thereby causing a backward horizontal movement to restore it to its normal position. This backward motion of the actuating bars, which is slightly more than one ratchet tooth, overcomes the forward force of spring 110, thereby permitting the spring 123 to force the hooked pointed end 114 of movable arm 109 to the left out of the slot 119, also by the force of the long arm part 125 of spring 123 contacting with flat plate 126 of rotary stop 116, it turns said stop to the right. This restores the bent arm 117 situated diametrically opposite slot 119 in rotary stop 116 to its normal position in the track of toothed projection 121 on vertical spindle 87, and further, allowing the upright stop pin 108 to resume its former position against angle 107 in actuating bar 96, thus restoring the lock between said ratchet toothed portion 98 and the ratchet teeth 91 on vertical spindle 87, thus resetting the carrying mechanism at the end of the registering motion of each actuating bar before the actuation of any other bar takes place. The rock shaft 140 and cam arms 143 associated therewith also serve an additional purpose, that of preventing forward movement of the actuator bars 96 when the indicators are reset to the zero position, as previously described.

From the foregoing description it is understood that whenever an indicator is carried from nine to zero, it releases the stops for the actuating bar next to the left and allows the bar to advance farther. When the resetting plate or bar 130 is moved to the left, it brings all of the indicators with which it is engaged into the zero position, thereby causing the several stops respectively at the left of each indicator, to be displaced, and allowing all of the bars except the extreme right-hand one, which abuts against a fixed and always immovable stop 108ª, to be moved forward by their springs 110 until their shoulders or projections 113 bring up against the vertical shafts 160. Such movement of the bars must be prevented in order that a resetting of the indicators may not unfit the apparatus for further correct calculations and carrying movements after any resetting. Accordingly we provide on the end of the rock shaft 140 a crank 140ª which is manually actuated by the operator. Whenever the indicators are to be reset, the operator first raises the crank 140ª and swings the arms 143 against the pins 114, thereby restraining the actuator bars 96 from motion when they are released, as before stated, during the movement of the indicator hands into zero position. That is, when the restraint of the stop 108 for each bar is removed, the arm 143 performs the same function and withholds the bar in its proper position.

Referring now to Figs. 1, 2ª, 6 and 7, it will be seen that at a point in the actuating bar 96 between its front slotted support 105 and its rear slotted support 106, a rock pin 146 passes through the bar, being movably mounted therein. Fixed on the left-hand end of this pin and projecting forward is an arm 147 having a horizontal projection 148 at its upper forward end, said projection extending to the right over the actuating bar, a recess 149 being cut in the top of the latter to permit the projection 148 to normally remain below its upper edge, and its forward end is of sufficient gravity to keep in this position. The front face of the projection 148 is formed from its top line in a receding angle, in order that when it is raised to contact with receding, angular, transverse bar 80, its draw will keep it automatically in contact therewith during its backward and forward motion, and be permitted to drop to its normal position when the transverse bar 80 returns to its full forward position against stop 83.

On the right-hand end of pin 146 is fixed a flexible spring arm 150 projecting to the rear, parallel with the side of the actuating bar. At its rear end this spring arm is formed in a raised and partly pointed half circle 151 to permit the end of an arm 183 projecting downward from transverse shaft 182, in its rotary motion, to pass over and to contact with it, in order to depress it, thereby raising the forward end of arm 147 and its projection 148 for contact with the angular, transverse reciprocating bar 80 in its backward movement.

Upon the lateral position of the typewriter carriage depends the numerical value of the typewritten figures, and thus upon the lateral position of the typewriter carriage must depend the actuation of the indicating hand of corresponding numerical value: i. e., if a figure representing cents be typewritten, the indicating hand over the dial at the extreme right must be actuated sufficiently to indicate the increased sum of any numeral from one to nine in value. The number of columns in which these figures may be written varies with the necessities of the user. In large mercantile or banking institutions, or in insurance tabulating, results even in billions might be desired, which, with separating period and commas, would require sixteen of the seventy-two positions provided by the traverse of the typewriter carriage, thus permitting four such separate columns of figures to be typewritten on a single sheet of paper. If, however, the amounts to be typewritten are small, their total sum never reaching ten thousand dollars, which with period and comma separations would require eight of the seventy-two positions provided by the traverse of the typewriter carriage, thus permitting nine columns of figures to be typewritten on a single sheet of paper, and their total sum to be recorded.

The drawings represent a mechanism capable of recording hundreds of millions, or one cent less than one billion of dollars. The mechanism is capable of a greater number of indicators if desired, producing accurate results.

At the left-hand side of the typewriting machine, (referring to Figs. 2ª, 7 and 8) near its rear part, are fixedly mounted on surface plate 12, two upright supports 152 and 153, supporting respectively at left and right, spindle 154, journaled therein upon which is mounted between said supports face cam 155. This member is cammed or recessed on its right-hand face with an outer 156 and an inner 157, circular groove, these grooves being connected by involute form of groove 158 to effect rise and fall motion of the pin 178″ of lever 177 as the cam rotates forward or backward. The left-hand side of this cam 155 has a sleeve 159 projecting within bearing 162, restricting end shake of spindle 154 with set screw 160, which permits adjustment to angular position. The left-hand bearing 162 serves a double purpose of supporting spindle 154 together with supporting rimmed wheel 161 on its cylindrically formed exterior bearing portion which extends to the left from its upright plane of support. Stud 163 firmly fixed in upright support 152 forms an outer attachment for spring 164.

The rimmed wheel 161 revolves freely without attachment other than its bearing, being actuated by involute flat spring 164 attached at its inner end to stud 165 projecting from the hub of wheel 161, and restrained by thin steel tape 166, one end of which is attached to its periphery and its other end passing over a rimmed wheel 166″ pivotally mounted in a suitable support, said tape continuing over said rimmed wheel and extending horizontally to the right over the steel tape of the typewriting machine, its looped end being detachably connected to hook 6 on the typewriter carriage. The force of involute flat spring 164 affords the necessary power to rotate its connecting parts and in addition, tends to add slightly to the force of the spring already provided to move the typewriter carriage, thereby relieving the latter spring from additional duty. The active force of spring 166 is renewed by the manually operated return of the typewriter carriage to its right-hand position.

On the left-hand side of wheel 161 (Fig. 8) are projecting teeth 167, equal in number to the number of spaces traversed by the typewriter carriage, the Remington machine affording seventy-two spaces. Further to the left and slidably bearing on spindle 154, is a hand piece or knob 168, the motion of which to the right or left engages with or disengages from wheel 161 through lever or catch 169. Stop screw 170 in rim of knob 168 serves to secure spring 171 which passes axis-wise through said hand knob.

Lever catch 169 is pivoted at 172 to an arm of knob 168 and engages a fixed stop 173 traversing a slot in spindle 154 and passing between the tines of fork end 174 of catch lever 169, the longer arm of which fork contacts with spring 171 in either position as catch or release. When the knob is pushed inward, its lower end is released from the stop spring 175 and then enters the toothed portion 167, so as to clutch the cam spindle 150 to said toothed portion 167, permitting the cam to rotate simultaneously with the motion of the typewriter carriage, by force of spring 164 or by the return motion of the carriage, thereby providing means, of connection, accommodating the mechanism to operate for columns of figures written at any desired position of the paper carried by the carriage.

Upright support 176, (Fig. 7) slotted at its top, serves as a support for lever 177 pivotally supported at 178, having a rear arm bearing a pin 178″ projecting within the groove in cam wheel 155, its forward arm being formed as a tooth segment capable of transmitting motion to pinion 179 fixed on transverse shaft 182.

Upright supports 180 and 181 fixed on surface plate 12 provide journal bearings for a transverse shaft 182 bearing fixed pinion 179 and also bearing fixed radial arms 183, the number of which is equal to that of the totalizing bars 96, arranged in a helical line equally spaced laterally, but unequally placed circumferentially, their lateral position being such that each is in the plane of the raised portion of one of the spring arms 150. Also fixedly mounted on the projecting ends of shaft 182 are two surface cams 184 and 185, their pitch circle 186 having indentations 187 and a projecting part 188.

Upright supports 189 and 190 (Fig. 3) firmly fixed in surface plate 12 furnish journaled pivotal bearings 191 for two corresponding rocking arms 192 and 193 extending forward and backward from their pivotal center, connected at their forward ends by a lateral, square-edged bar 194. Its rear arms have upward tooth projections 195 which normally contact with the different faces of cams 184 and 185, and held so by springs 196.

On the forward ends of rods 61 is fixed a small collar 197 serving as a stop to their posterior motion when contacting with bar 194.

Connected with arm 192 and extending forward is a projecting arm 198 slotted at 199 at the under side of its forward end. Its depression is permitted by the downward movement of arm 192 to which it is attached when the upward projection 195 on its rear arm enters either notch 187 in cams 184 and 185, and its notch 199 is caused to embrace an upright projecting lug 199′ on vibrating arm 216, thereby holding it in a fixed position, and so placed that none of the slots 23 in the forward ends of the members 19 will embrace transverse rod 218, thereby preventing the typewriting of a numeral when the typewriting carriage is at a point to write a period or commas between the denominational groups of figures.

The grooves of the cam 155 are so constructed that no movement of the armed lever 177 can occur, except when the involute formed portion of groove 158 contacts with projecting pin 178″, and this involute portion of groove 158 is between an angle of sufficient number of degrees to effect the rise or fall of arm 177 while the typewriter carriage is passing over fifteen of its step movements, providing three step places for each millions, thousands, hundreds, and two places for cents, together with three places for separating commas and period, making in all eleven numerals and three step places. These, together with a place of rest either before or after writing a line of figures, make in all fifteen positions.

The teeth of pinion 179 fixed on shaft 182 are fifteen in number, thus providing in its total revolution for the fourteen step positions above described, and one position of rest, fifteen in all. Thus the rotary motion of pinion 179 and connected shaft 182 is either one complete forward or backward full revolution during the pin 178″ traversing the involute portion 158 of the cam groove. Before the pin 178 enters, or after it leaves, involute portion of cam groove 157, it remains stationary, positioned in either the inner or outer cam grooves, the circular lengths of which pass through an angle sufficient that the entire traverse of the typewriting machine carriage may occur without pin 178″ entering the involute portion of groove, and during either of these intervals the rotating faced cams 185 are in a position of rest, and their projecting points 188 contacting with teeth 195, depress part 193, consequently raising front portion 192 and its connecting square-edged bar 194 with collars 197, thereby preventing the connection of any eccentric to its revolving ratchet 44, thus preventing the totalizing of any number written, the entire mechanism being thus thrown out of action when not desired for use.

An upright bearing 201 fixed to surface plate 12 supports a fixed pivot 203 bearing members 205 and 206 at the right. Member 206 is permitted to rock independently, its rear upward arm 207 contacting under transverse bar 194, its downward arm 207′ having a pivotal support 207″ for forwardly projecting link 208, its forward end having a restraining catch 209 (Figs. 1 and 2) and knob 210 for manual operation. The downward motion of member 205 communicates an upward motion of member 206, thereby raising square bar 194 in position to contact with collars 197.

Attached pivotally to member 205 is an upright connecting rod 213 (Figs. 1 and 3) having a suitable detachable contact at its top extremity with curved crank lever 13 which falls when the shift key is depressed, to write "upper case characters" on the typewriting machine.

Upright supports 214 and 215 fixed to surface plate 12 form journaled bearings 216′ and 217′ for upright rocking arms 216 and 217. These two rocking arms are connected by a traverse rod 218 which is rocked by the embrace of the slots 23 in the front ends of members 17 in its downward motion. The situation of each of the slots being at a different radial distance from their pivotal centers, only one of the members can rock downward at the same time, those remaining out of embrace being stopped by a slightly different position of bar 218. The slots 23 have a widened opening with rounded contacting faces, in order that any slot will find its position, enabling bar 218 to enter therein. These arms 216 and 217 with their rod 218 are normally held upright in such position that the notch 199 of the extension bar 198 on the left-hand rocking arm 192 may accurately embrace and engage the lug 199′ when depressed, by means of springs 220 and 221 which are clamped, by screws or otherwise, to a block 222 projecting from the support 214. These springs are held by their resiliency against a spacing stop or lug 223, which is equal in width to the rod 218, and extend beyond the stop so as to embrace the rod and hold it central. In this position (shown in Fig. 3) the lug 199′ is in the path of movement of notch 199, but at the same time the bar 218 and arms 216 217 are free to move against the yielding resistance of the springs when engaged by the slots in the release levers 17, and the springs return said bar and arms to central position when disengaged from these levers 17.

The typewriting machine which in the accompanying drawings is shown as a "Remington" (but which by slight adjustment may be any of the so-called "key-lever machines"), when placed upon the supports provided at the four corners of the mechanism, is so positioned that in the depression of any of the nine number keys, the bottom edge of its key-lever bar makes a detachable contact with the friction-reducing roller 21 pivotally mounted on the rocking arm 17 directly beneath, thus imparting a downward motion to the forward end of such arm. The concentric slot 23 in such member 17 with slightly flaring, rounded faces at its opening, permits the embrace of rocking transverse rod 218, thus rocking said rod slightly forward or backward, and holding it in a position whereby no other similar member (the concentric slot in each being at a slightly different distance, radially from their pivotal point) can embrace said rod, thereby preventing the actuation of a second key, until the first one operated has completed its movement and returned to its normal position.

The downward movement of member 17 causes an upward movement of its rear projecting parts 17′ and 17″, which, contacting with point 29′ of release arm 29, rocks the latter slightly backward, together with spring 62 and connecting link 61, the forward end of which is connected to said arm near its upper end. The rearward motion of link 61 causes the release and operable connection of one of the actuating eccentrics, as will later be described. As only a slight depression of the number key is sufficient to cause actuation of the totalizing mechanism it would be possible to cause several actuations by slightly touching a number key, without depressing it far enough to cause the type bar to print a number by striking the platen. To prevent this, the lazy dog, so called, 24 is provided, the eccentric face 24′ of which rocks in frictional contact with concentric face 17′, permitting the latter to rock upward freely but preventing any return motion, until forward curved arm 19, when the member 17 reaches its lowermost position, contacts with the projecting pin 25, and rocks the lazy dog backward, causing the V teeth 25′ at its lower end to slip forward over the holding teeth 28' in bar spring 28, relieving the contact of the two surfaces 17' and 24', and permitting arm 17 to return to its normal position. In so returning at the end of its motion, curved arm 20 contacts with the pin 25, rocking the lazy dog forward into contact with member 17', its V teeth 25' passing over and being held at the rear side of teeth 28', in bar spring 28, thus restoring the former conditions, and thereby compelling a full downward stroke of a number key lever and the printing of a corresponding numeral before actuation of any other totalizing mechanism. Expanding spring 27 having looped ends embracing stud 26 on member 17, and also stud 29'' on arm 29, restores member 17 and arm 29 to their normal positions.

The slight backward movement of arm 29 through rod 61, and its pushing spring part 62, communicates a backward rocking motion to upright rocking arm 55, causing projection 54 on arm 53 to fall through slot or opening 59 below the under side of pallet 57, and removing all restraint against its rotation with member 49, its falling motion causing the forward point of arm 53 to swing upward, and to slip from the top of upright post 63, at the same time rocking the point of ratchet pawl 51 on the right of spindle 50 backward and into contact with a tooth of ratchet wheel 44. Said wheel, as previously described is fixed on revolving shaft 41 which revolves forward quite rapidly, driven by the motor 32 or other driving means, and when so connected, gives instantaneously a forward rotary motion to member 47 which is mounted on horizontally projecting bearing 46, being formed as a sleeve around shaft 41, but not in any way contacting with it, and carries the eccentric 48. The movement of member 47 is limited to a single rotation by projection 54, on arm 53 coming into contact at the end of a revolution with the second horizontal pallet 58 projecting to the right from the top of the upright rocking arm 55, thereby throwing the forward point of arm 53 outward and downward in position to strike the top of upright stud 63, and at the same time disengaging pawl 51 from ratchet wheel 44. The forward point of arm 53 resting on upright stud 63 and its rear projection 54 resting on pallet 58, holds arm 53 in a horizontal position, with its pivotal part 50 passing horizontally through flanged member 49, while arm 55 is in its backwardly rocked position and stops the rotation of member 49 and eccentric 48. This revolving and stopping motion is so rapid that the arm 55 operated through link 61 and arm 29 cannot by manual operation be released quickly enough to permit it to swing forward and allow projection 54 to contact with any part but the front pallet 58. In subjecting the mechanism to high speed tests, it has never failed to make one revolution and stop, and the amount of power to simply rock upright arm 55 backward is inappreciable. We consider this one of the most important parts of this invention. Upon the rocking forward of upright arm 55 projection 54 falls to pallet 57, thereby still locking member 47 from rotation, but taking a position where a subsequent depression of its appropriate number key will permit its release and produce a result like that above described. There are nine of these members 47, each bearing an eccentric of different eccentricity. The eccentric which is rotated upon the depression of number one key, causes through its strap and eccentric rod, a backward movement of about one-fourteenth of an inch; that which is rotated upon the depression of a number nine key, causes a backward movement of nine-fourteenths of an inch; and the intermediate eccentric members are constructed to effect motion in proportion, corresponding to the numerical value indicated in their corresponding number keys.

The looped end 75 of eccentric rod 74, of which there is one such rod for each eccentric, projects forward, its looped end embracing transverse rod 81, fixedly mounted at its ends in rocking arms 79 depending from pivots in upright supports 76 and 77. The backward movement of rod 81 is caused by the rotation of any eccentric, and its forward movement by the springs 82 mounted in upright supports 76 and 77 their force being directed against the rear sides of downwardly projecting arms 79, and these movements cause backward and forward movement of the actuating bars 96 through the transverse angle-bar 80, also fixedly mounted in said arms near their extreme lower ends, which engages the detent or movable arm 147 of any of such bars when one of these detents is raised by one of the helically arranged rotating radial arms 183. Engagement between the bar 80 and detent is maintained by the undercut formation of point 148 of such detent. The elevation of a detent 147 by depression of its rear arm 150 occurs at the time of the stepping motion of the typewriting machine carriage after the recording of a sum previously typewritten, thus providing detachable engagement between bar 80 and a totalizing bar 96 in advance of its required use. Thus an actuating bar for adding a figure of the next lower denomination is made ready for operation immediately before its motion is required to totalize a typewritten amount.

The different degrees of backward and return motion of the angle-bar 80 afford controlled, varied, predetermined motions, by which a single revolution of any of the nine eccentrics, each operating upon the depression of the number key by which it is controlled, communicates an amount of motion proportional to the numerical value represented by the key to any one of the eleven actuating bars which correspond in numerical value to the value indicated by the position on the sheet in which a number is typewritten. As has been explained, this selection of the particular corresponding indicator according to numerical value, is dependent upon the position of the typewriter carriage, and is obtained as follows: The involute flat spring 164 attached at its outer end to stud 163, and at its inner end to projecting pin 165 on the hub of the band wheel 161, tends to rotate the band wheel in a counter clock-wise motion (looking from right to left, Fig. 8). Fixed to the face of said band wheel and coiled around it between its flanged edges is a thin steel tape 166, passing up from its front limb over a rimmed trundle wheel 166″ pivotally mounted in frame 166′, which frame is fastened to an upright support of the typewriting machine frame, thence in a horizontal direction across the machine to the right, and to the carriage, being immediately above and parallel to the steel tape already provided to actuate the step motion of the carriage, its looped end being passed over the same hook 6 as the machine tape. Spring 164 thus provides sufficient rotating force to operate the face cam 155 and other parts driven thereby, and in addition, aids in moving the typewriter carriage, so that the spring already provided for the latter purpose is not called upon for additional duty.

The affixing of the frames of the typewriter and attachment and drawing the tape over the trundle wheel, attaching its loop to the hook 6 and turning a thumb-screw in another part, is all the connection required to insure the mechanism to be in operable connection with the typewriting machine. It may here be stated that a cord or chain may be used instead of a tape, and that such a substitution is within the scope of our invention.

Thus the band wheel turns forward by force of its spring, its motion being limited by restraint of the steel tape attached to the carriage, just as far as its step motion to the left permits, and said wheel turns backward by means of the steel tape when the carriage is manually returned to its right-hand position.

The cam 155 is fixed to spindle 154 and turns with it. The knob 168 slides to the right and left on spindle 154 and by its pin 173 between the tines of forked lever 169, rocks said lever on its pivotal support 172, so upon the sliding movement of the knob to the right, the right-hand edge of the forked lever is carried to the right and caused to enter between two of the radial teeth 167 (seventy-two in number) on the left-hand side of band wheel 161, thereby permitting a connection of the cam to the tape wheel, and thereby to the carriage in any relation thereto.

The outside and inside concentric grooves in the cam face provide for holding the pin 178″ without actuation during the rotation of the cam. If the knob operating forked lever arm 169 be withdrawn to the left and turned so that the point of said lever passes over one of the springs 175, being stopped between them, and the knob and lever are then pressed to the right fixing arm 169 between two of the radial teeth 167 on the band wheel, the position of the cam is such that the pin 178″ is ready to enter the involute groove 158 in cam 155 at the next step motion of the carriage, and then to be in position for causing indication on the left-hand dial of a figure written in the hundred millions column. Thus the location of the column of figures, in relation to the numbered steps of the carriage, being determined, the operative connection of the mechanism may be easily and correspondingly made with perfect accuracy. Upon pin 178″ entering involute groove 158, the rotation of the cam step by step, permitted by force of its spring, and released through the tape connection, by each movement of the carriage, will rock the rear arm 178′ upward. The front segmental toothed portion 179′ of lever 177 will thus be rocked downward until pin 178″ is embraced by inner concentric groove 157, when its continued rotation will not further effect lever 177, thus permitting the writing of letters or numerals or other characters both before reaching or after passing a predetermined location for the column of figures. Movement of the lever 177 through its segmental teeth meshing with teeth of pinion 179 fixed on shaft 182 rotates said shaft. The radially projecting arms 183 fixedly mounted on said shaft are regularly positioned, and transversely distanced, so that their extreme ends during rotary motion will be in line to contact with spring arms 150 at 151, thereby depressing said arms successively and affording contact of arm 147, and end 148 with angular bar 80, thus selecting the connection for the movement of the actuating bars in regular order from left to right. The angular positions of arms 183 on shaft 182 are such that when the pin 178″ enters the involute groove one step, the left-hand arm end raises the contacting arm 147 of the first left-hand actuating bar, which moves the left-hand indicator representing hundred millions. If now a figure be typewritten while the carriage remains at that point, it will be totalized, or recorded on the first left-hand indicator. The next two arms 183 connecting the next two actuating bars indicate tens of millions and millions respectively, and are angularly placed so that they follow in sequence the next two steps of the typewriter carriage. The position of the next step point is for writing a separating comma between millions and hundred thousands. At this point no totalizing should occur, so the arm for connecting the actuating bar to indicate hundreds of thousands is placed on shaft 182 at twice the angular distance between any two of the arms mentioned, and this double angular distance is also employed in fixing the other arms 183 on shaft 182, so that when writing a comma between thousands and hundreds, and at the point of writing a period between dollars and cents, no actuation of any actuating bar will occur.

By changing the position angularly of arms 183, the spacings may be changed or entirely omitted, the figures being written in columns of three, four, five or more, or in a solid block of eleven figures if desired, and their correct values totalized.

To prevent a number key being depressed at the point where a separating comma or period should be written, the indentations in circular cam faces 187 are so positioned relative to the cam wheel and its connections as to permit point 195 to enter therein whenever a separating point is to be written, this slight upward motion depressing arm 198, causes slot 199 to embrace lug 199', thus locking rod 218 in a position to prevent the embrace of any of the concentric slots in members 17, thereby preventing the key levers bearing numerals from actuation. The projection from face of circular cams 184, 185 is so positioned relative to the cam wheel and its connections as to depress point 195 on levers 192, 193, thereby throwing rod 194 upward, its square edge contacting with collars 197 on connecting rods 61, thus preventing the communication of motion to any of the eccentrics, thereby permitting letters, figures or characters to be written at any part of the traverse of the carriage without operating the totalizing mechanism except at the predetermined location for a column of figures.

The pushing springs 62 on the forward ends of connecting bars 61 permit the backward movement of arm 29 during the contact of bar 194 with the collar 62, they being provided for this purpose.

It will be noticed that projections 188 are in constant contact with points 195 during such times as pin 178'' is embraced by either of the concentric grooves 156 157 in cam 155.

It has been shown that the rocking arms 79 and connecting angle-bar 80 upon the depression of any number key is rocked backward a predetermined distance from one-fourteenth of an inch to nine-fourteenths by the controlling motion of any one of the nine eccentrics, and that any one of the actuating bars relative in position to the space-denoting denomination in which a figure is typewritten is automatically brought into contact with the angle bar for movement therewith, and said contact occurs upon the stepping motion of the carriage and just before the manual depression of a number key. The first movement of the actuating bar is backward until one-half of the rotary motion of the eccentric is completed, or until its center is in rear of the center of shaft 41. Its further rotation allows the two springs 82 to return the arms 78 and the angle-bar 80 forward, and with it the connected actuating bar to its normal forward position.

In its rearward motion the side formed ratchet teeth of the actuating bar slide over those of the vertical spindle 87, the latter being locked from rotation in that direction by spring detent 94. Upon its forward return, by force of spring 110, the ratchet teeth of these two members being pressed into close contact by roller 101, the actuating bar causes vertical spindle 87 to rotate through as many of its ten tooth spaces as the bar has been drawn backward, and its indicating hand 88 to point to a newly indicated number on the corresponding one of the several indicating dials.

The numbers on the dials might be omitted, as after a few hours' practice, the ten positions of the indicating hand become so familiar that results are read at a glance, as readily as one could tell the time of day by the position of the hands of a clock if the indicating figures were to be removed. In the clock twelve hour points and sixty minute points are in mind, and are read at a glance at the dial. The number dials here shown have but ten single points of indication.

The indicating hand in its rotation points directly to the rear at zero, and upon reaching said point, the indicating hand of the dial next to the left is instantly actuated one-tenth of its revolution to indicate the carrying of tens to the indicator of the next higher denomination or numerical value by removal of the stop which prevents forward movement of the said left-hand actuating bar, the wedge-shaped part 107 of each bar, it will be understood, contacting with pin stop 108 and forcing its teeth firmly into contact with those of the ratchet spindle, as has been explained. It may be here parenthetically remarked that this locking feature, preventing any over motion, relieving the shock of sharp contact (although it is diminished by the lightness of construction of its parts) is an exceedingly important part of the invention. Thus to carry one to the indicator of the next higher numerical value, the vertical spindle next to the left of that in actuation must rotate one tooth space, and a release from its lock is effected by the fixed projecting tooth 121 on the lower part of vertical spindle 87 contacting with bent arm 117 when its hand reaches zero, thereby revolving rotary stop 116 to the left, permitting the point 114 of arm 109 to enter slot 119 for the force of spring 110 acting through wedge 107 on stud 108 overcomes that of spring 123 and causes the free end of arm 109 and its stop pin 108 to move to the right. The next left-hand actuating bar is thus permitted to move forward from its normal stopped position until the right angular projection of the actuating bar contacts with rotary stop 116, this motion being enough to cause the corresponding vertical spindle to turn one tooth part, its indicating hand passing to a new number of indication. After such one step forward movement of any or all of the actuating bars (except the right-hand one, which in this apparatus indicates cents, which never receives any increase from carried tens) to carry tens, they must be restored to their normal position or moved backward one ratchet tooth space, in order that they may be in a position to carry during the next actuation of any bar, and this restoring or resetting of the carrying mechanism occurs at the end of any actuation of the bars, and before a new actuation can take place. For this purpose the projecting tooth 68 formed on the face of flanged member 49 rotates from its normal position (which is slightly above tooth 67' on arm 66) to contact at the extreme end of such complete revolution with tooth 67', thereby rocking shaft 64 and also arm 70, which by link 71, communicates a backward motion to upright crank arm 145, thus rocking the fixed arms 143 on shaft 140 backward and through contact with pins 144 of such bars as have moved forward the one tooth space, overcomes the force of spring 110, restoring said bars to their normal position, and this movement occurs at the end of every movement required to totalize a typewritten number. Upon return of a bar, its stop pin 108 regains its normal position, re-locking the bar to its vertical spindle as before stated, and the pin 116 swings back under the influence of spring 123 so that its segmental part opposes resistance to further motion of the hooked end of the arm which carries the stop.

During the writing of capitals or of "upper case" characters, the shift key is depressed and during its depression, if either of the number keys having an upper case character be accidentally used, within the predetermined space selected for the column of figures, the totalization of a number would be recorded. To prevent this, we provide the upright bar or link 213 detachably connected with screw in the shift arm 7, which is lowered upon shifting movement of the typewriting machine carriage rearwardly. The lower end of this link is pivotally connected with arm 205 which it rocks upon its descent. This member by its shoulder contacting with pin 207' fixed in arm 206, sets up similar motion in arm 206, causing its point 207 to contact with square edged bar 149, thereby raising it to contact with stop collars 197, thus accomplishing the purpose of preventing actuating movement during the writing by error, of capitals or upper case characters within the space provided for writing the column of figures.

An additional method of making the mechanism inoperative is by means of horizontal rod 208 having a linked end embracing pin 207", said link passing forward beyond the front of the mechanism, terminated by a knob or hand piece 210. Just back of knob 210 is a notch (Fig. 1) which provides means of holding rod 208 backward.

The pushing backward of rod 208 by knob 210 until caught by the notch, forces lower end of movable arm 206 to the rear independently of arm 205, thereby raising its rear arm 207, contacting with square-edged bar 149 and raising the latter into contact with stop collars 179, and thus preventing any connection from the type key levers to the operative eccentrics, preventing all actuation of the mechanism.

It will be noted that the number keys of the typewriting machine do not by themselves directly control or operate the calculating mechanism, but that their depression causes the calculating mechanism to be operated through the contact which they make with the release levers or members 17. It will also be noted that these levers 17 may be manually operated directly when the typewriting machine is lifted from the base and removed from the calculating apparatus, or these members 17 might be provided with finger touch pieces whereby they can be easily manipulated. The calculating apparatus can thus be used independently of the typewriting machine as a table-adding machine.

We claim:—

1. The combination with a typewriting machine having key levers operable to cause writing of numbers, of a calculating apparatus consisting of a frame, number indicators, a plurality of automatic stop-motion devices connected to operate said indicators, and release members for the several stop-motion devices operable to permit actuation of the latter, said release members being spaced correspondingly to the key levers of the typewriting machine, and the said frame being constructed to support the typewriting machine with its key levers in position to engage and operate corresponding release members, when themselves operated.

2. The combination of a typewriting machine complete in itself having number key levers, and a calculating machine, also complete in itself, having a frame constructed to support the typewriting machine in a removable manner and constituting a sub base for the latter; said calculating machine comprising also counting numeral indicators, normally inoperative driving means therefor, and control devices for rendering said means operative, arranged beneath corresponding keys of the typewriting machine and operable by the latter through simple contact.

3. The combination with a typewriting machine having number keys, of a calculating apparatus including release levers, number indicators, power-driven means for operating said indicators, and a selector for making connection between any one of said number indicators and any one of said power-driven means, the typewriter number keys being engageable with said release levers respectively by simply placing the typewriting machine upon the calculating apparatus, a spring for actuating and a tape for governing said selector, said tape being detachably engageable with the typewriter carriage.

4. In combination, a calculating apparatus including a frame, indicators for representing sums, actuators representing the nine digits, intermediate connections by which any one of said actuators may drive any one of said indicators through a distance corresponding to the numerical value represented by said actuator, a selector for connecting said indicators in turn for operation by said actuators, release devices organized and arranged for permitting movement of the several actuators, a typewriting machine, a series of number keys therefor representing numbers from one to nine, said typewriting machine being placeable upon the calculating apparatus frame so that each number key will be in a position to engage and actuate the corresponding release device of the mechanism, a carriage for the typewriter, and a detachable connection between said carriage and selector whereby the latter is governed in its action by the travel of the carriage.

5. In combination, a calculating apparatus base, indicators for representing sums, actuators representing the nine digits, intermediate connections by which any one of said actuators may drive any one of said indicators through a distance corresponding to the numerical value represented by said actuator, a selector for connecting said indicators in turn for operation by said actuators, a typewriting machine, a series of number keys therefor representing numbers from one to nine, said typewriting machine being placeable upon the calculating apparatus so that each number key will be in a position to permit actuation of the corresponding actuator of the mechanism, a carriage for the typewriter, and a flexible tape connected with said selector and detachably attached to said carriage for governing the action of said selector and causing sums to be totalized when figures are written in selected spaces on the paper carried by said carriage.

6. The combination with a typewriting machine, the number keys and the paper carriage thereof, of a calculating mechanism comprising a base adapted to hold said typewriting machine in a certain position, release members equal in number to said number keys, arranged so that any one is operated by contact with its respective number key when the latter is depressed, totalizing indicators, a single intermediate actuator, separate means controlled by the several release members for giving said intermediate actuator movements proportional to the numerical values of said main actuators, and a selector operated by said typewriter carriage for placing any one of said totalizing indicators in condition to be operated by said intermediate actuator.

7. The combination of a calculating apparatus having a series of main actuators each representing a different number, indicators for showing the results of the calculation, a selector for rendering said indicators in turn operable by the said actuators, a typewriting machine, number keys therefor, a paper carriage for said typewriting machine, and an operating connection between said carriage and said selector, said connection being readily disconnectible and being one of the only two elements which must be connected or disconnected when the typewriting machine is applied to or removed from the calculating apparatus.

8. The combination with a typewriting machine, calculating apparatus comprising a framework, totalizing indicators, a constantly driven shaft, a swinging bar, numeral keys, a series of actuators released by the said numeral keys for causing the shaft to move said swinging bar by distances proportional to the numbers represented by the several keys and actuators, and means for successively rendering the different totalizing indicators connectible with said bar.

9. The combination with a typewriting machine and the number keys thereof, of a calculating attachment comprising a series of stationary dials, a rotary indicating hand coöperating with each dial to indicate numbers, toothed elements connected with each of said hands, a reciprocating bar having teeth coöperating with each of said toothed elements for rotating the hands, a swinging bar, a series of actuators each released by one of the typewriter number keys, connections through which any of said actuators will cause said bar to move a distance proportional to the number represented by said actuator, and means for putting each of said reciprocating bars into connection with said swinging bar.

10. The combination with a typewriting machine and the number keys thereof, of a calculating attachment comprising a series of stationary dials, a rotary indicating hand coöperating with each dial to indicate numbers, toothed elements connected with each of said hands, a reciprocating bar having teeth coöperating with each of said toothed elements for rotating the hands, a swinging bar, a series of release levers each operated by one of the typewriter number keys, connections through which operation of any of said levers will cause said bar to move a distance proportional to the number represented by said actuator, means for putting each of said reciprocating bars into connection with said swinging bar, and means for preventing return of said release lever until the number key has been moved far enough to cause a type impression on the paper carried by the typewriting machine.

11. The combination with a typewriting machine and the number keys thereof, comprising a shaft, a series of eccentrics loosely mounted and having varying amounts of eccentricity progressing in order from a unit to nine times that amount, a plurality of release elements each operated by one of the typewriter number keys, and each adapted to connect one of said eccentrics to the shaft, a stop motion mechanism for arresting the movement of said eccentric after the same has made a complete revolution, a series of totalizing number indicators, and means for communicating the movement of any of said eccentrics to any of said indicators.

12. In combination with a typewriting machine and number keys forming part of such machine, a calculating mechanism including a series of pointers or hands for indicating results of calculations, the axes of the series being in a substantially straight line, and means controlled by said number keys for rotating said pointers through distances proportional to the numbers represented by the keys, said means including a plurality of movable actuator bars, one for each pointer.

13. In combination with a typewriting machine, and number keys forming part of such machine, a calculating mechanism comprising indicators for showing the results of calculations, a reciprocating driver for moving each of said indicators, a common actuator for moving all of said drivers, but normally disconnected therefrom, means whereby the several number keys may cause said actuator to travel distances proportional to the values of the numbers represented by the keys, and means for connecting any one of said drivers with said actuator.

14. In combination with a typewriting machine, and number keys forming part of such machine, a calculating mechanism comprising indicators for showing the results of calculations, a reciprocating driver for moving each of said indicators, a common actuator for moving all of said drivers, but normally disconnected therefrom, a constantly driven shaft, a series of eccentrics equal in number to said number keys, connections from the several said eccentrics with said actuator by which said eccentrics may move the actuator through distances proportional to the values of the numbers represented by the number keys, and devices operated by each number key for connecting its respective eccentric with said shaft to produce a single complete operative movement of the actuator.

15. In combination with a typewriting machine, and number keys forming part of such machine, a calculating mechanism comprising a series of indicators for showing results of calculations, pinions associated with said indicators, driver bars each having a toothed portion engaged with said pinions, and means rendered operative by depression of any of said number keys for actuating any of the driver bars.

16. In combination with a typewriting machine, and number keys forming part of such machine, a calculating mechanism comprising a series of indicators for showing results of calculations, pinions associated with said indicators, driver bars each having teeth held yieldingly against the teeth of said pinions and shaped so as to slip by the same when retracted and to engage them to advance the indicator when moved in the opposite direction, means governed by the number keys for retracting said bars, and springs for advancing said bars.

17. In combination with a typewriting machine, and number keys forming part of such machine, a calculating mechanism, comprising a series of indicators for showing results of calculations, pinions associated with said indicators, driver bars each having teeth held yieldingly against the teeth of said pinions and shaped so as to slip by the same when retracted and to engage them to advance the indicator when moved in the opposite direction, means governed by the number keys for retracting said bars, springs for advancing said bars, and stops arranged to limit the advance movement of the bars.

18. A calculating apparatus comprising a set of indicators for showing the results of calculations, toothed elements associated with each of said indicators for giving motion thereto, toothed drivers meshing with said elements, and means for moving said drivers back and forth through distances proportional to the numerical values of the several digits to drive said toothed elements and indicators correspondingly.

19. A calculating apparatus comprising a set of indicators for showing the results of calculations, toothed elements associated with each of said indicators for giving motion thereto, toothed drivers meshing with said elements, and means for moving said drivers back and forth through distances proportional to the numerical values of the several digits to drive said toothed elements and indicators correspondingly, the intermeshing teeth of said elements and drivers being shaped to permit slipping of the drivers past said elements in one direction and to cause positive engagement in the opposite direction.

20. A calculating apparatus comprising a set of indicators for showing the results of calculations, toothed elements associated with each of said indicators for giving motion thereto, driver bars having teeth being inclined on one side and square on the other with respect to the directions of movement of the bars, held yieldingly in engagement with the teeth of said elements, whereby movement of the bars in one direction without actuating said elements and indicators is permitted, and in the opposite direction positively engages and drives the same, and mechanism for reciprocating any of said bars through distances proportional to the numerical values of the several digits.

21. A calculating apparatus comprising a set of indicators for showing the results of calculations, toothed elements associated with each of said indicators for giving motion thereto, driver bars having teeth being inclined on one side and square on the other with respect to the direction of movement of the bars, held yieldingly in engagement with the teeth of said elements, whereby movement of the bars in one direction without actuating said elements and indicators is permitted, and in the opposite direction positively engages and drives the same, mechanism for reciprocating any of said bars through distances proportional to the numerical values of the several digits, and stops arranged to crowd the bars against the toothed elements at the conclusion of their predetermined movement and prevent further advance of either.

22. A calculating apparatus comprising a set of indicators for showing the results of calculations, toothed elements associated with each of said indicators for giving motion thereto, driver bars having teeth being inclined on one side and square on the other with respect to the direction of movement of the bars, held yieldingly in engagement with the teeth of said elements, whereby movement of the bars in one direction without actuating said elements and indicators is permitted, and in the opposite direction positively engages and drives the same, mechanism for reciprocating any of said bars through distances proportional to the numerical values of the several digits, an inclined shoulder on each said bar, a stop located in the path of said shoulder so as to be engaged thereby at the end of the operative movement of the bar, the inclination of said shoulder causing the bar to crowd against the teeth of said element and prevent excess motion thereof.

23. A calculating apparatus comprising a set of indicators for showing the results of calculations, toothed elements associated with each of said indicators for giving motion thereto, flexible resilient bars having forwardly inclined teeth held yieldingly against the teeth of their respective toothed elements, whereby said bars may be retracted without actuating the toothed elements, and manually controlled elements for moving said bars back and forth proportionally to the values of the several digits.

24. A calculating apparatus comprising a set of indicators for showing the results of calculations, toothed elements associated with each of said indicators for giving motion thereto, flexible resilient bars having forwardly inclined teeth held yieldingly against the teeth of their respective toothed elements, whereby said bars may be retracted without actuating the toothed elements, manually controlled elements for moving said bars back and forth proportionally to the values of the several digits, inclined stop shoulders formed on said bars on the side thereof opposite to the teeth, and abutments located in the path of said shoulders for forcing the bars against the toothed elements and arresting the forward movement of both.

25. A calculating mechanism comprising a series of indicators for showing results of calculations, pinions associated with said indicators, driver bars each having teeth held yieldingly against the teeth of said pinions and shaped so as to slip by the same when retracted and to engage them to advance the indicator when moved in the opposite direction, manually governed means for retracting said bars, springs for advancing said bars, stops arranged to limit the advance movement of the bars, and means caused by the motion of the indicators in passing to the zero indication to displace the stop for the next left-hand bar and permit a further motion thereof for carrying tens.

26. A calculating mechanism comprising a series of indicators for showing results of calculations, toothed elements associated with said indicators, driver bars each having teeth held yieldingly against the teeth of said pinions and shaped so as to slip by the same when retracted and to engage them to advance the indicators when moved in the opposite direction, means manually governed for retracting and advancing said bars, a stop shoulder on each bar, a movable stop normally arranged in the path of each of said shoulders for preventing overthrow of the bars, means tending to displace said stop from such path, an abutment preventing such displacement of the stop, and a tooth driven simultaneously with each indicator operable to disable the abutment for the next stop to the left when such indicator is moved into the zero position, whereby such stop is permitted to release its bars and permit a further movement of the same for carrying tens.

27. The combination with a typewriting machine, of a plurality of counting indicators remaining continually in the same place, a completely revoluble eccentric, means for rotating the eccentric, and controllable means for connecting the eccentric with either indicator to actuate it.

28. In a calculating machine the combination with numeral indicators of a pinion connected with each indicator, a toothed indicator engaged with each said pinion for turning the same, the teeth of said pinion and actuator being so inclined as to permit the teeth of the pinion to slip past the teeth of the actuator in one direction, and a setting member for bringing said actuator into zero position having teeth arranged to engage said pinions and being movable in the direction in which said pinion teeth may slip past the actuator teeth.

29. In combination with a typewriting machine, and number keys forming part of such machine, a calculating mechanism comprising a series of indicators, a constantly-driven shaft, a series of eccentrics loosely mounted concentrically with respect to said shaft, having different amounts of eccentricity proportional to the numerical values of the number keys, a stop motion mechanism for each eccentric released by the corresponding key and constructed to connect its eccentric, operatively with the shaft during one rotation only, and disconnectible driving connections through which the motion of the several eccentrics is transmitted to the several indicators.

30. In combination with a typewriting machine, and number keys forming part of such machine, a calculating mechanism comprising a series of indicators, a constantly driven shaft, a series of eccentrics loosely mounted concentrically with respect to said shaft, having different amounts of eccentricity proportional to the numerical values of the number keys, a clamping dog connected with each eccentric, a stationary and a movable abutment normally holding said dog and its eccentric stationary, means operated by the number keys for displacing the movable abutment for the corresponding eccentric and clamping dog, whereby the dog is adapted to secure its eccentric operatively to the shaft, said movable abutment having provisions also for releasing the dog after one revolution, and disconnectible driving connections through which the motion of the several eccentrics is transmitted to the indicators.

31. A calculating apparatus comprising a plurality of indicators, a power driver, and intermediate mechanism normally inoperative for actuating said indicators by various amounts from said driver; said mechanism including a series of eccentric elements having different amounts of eccentricity proportional to the several digits and normally disconnected from said driver a connector for each of said elements, and manually controlled release devices for permitting said connectors to become operative and connect the elements with the driver.

32. A calculating apparatus comprising a power driver, a series of eccentric elements separate from said driver, and having different amounts of eccentricity proportional to the values of the several digits, connectors yieldingly impelled to connect the several eccentric elements with the driver so that they may be driven thereby, a displaceable stop for each connector normally holding the same inoperative, and release members, each engaged with one of said stops and manually operated to displace its stop and permit the respective connector to become operative, indicators, and mechanism for putting the indicators into driven connection with any of the eccentric elements.

33. A calculating apparatus comprising a power driver, a series of eccentric elements separate from said driver, and having different amounts of eccentricity proportional to the values of the several digits, connectors yieldingly impelled to connect the several eccentric elements with the driver so that they may be driven thereby, a fixed stop and a movable stop arranged adjacent each connector so that the latter may normally be kept inoperative and held against any motion whatever, release devices each connected with one of said movable stops and manually operated to disengage the same from its corresponding connector and permit the same to become operative, result indicators, and connecting means by which any of said indicators may be put into driven connection with any of said eccentric elements.

34. A calculating apparatus comprising a power driver, a series of eccentric elements separate from said driver, and having different amounts of eccentricity proportional to the values of the several digits, connectors yieldingly impelled to connect the several eccentric elements with the driver so that they may be driven thereby, a fixed stop and a movable escapement, having two stops separated by a space, arranged near each of said connectors and engaged thereby so as to hold the connector inoperative and prevent its motion, a plurality of release devices each connected with one of said escapements and manually operated to disengage one of the stops of such escapement from the corresponding connector, thereby permitting the same to become operative, and place the other stop in the path of the connector to disconnect the same and bring it and the associated eccentric element to rest, result indicators, and connecting means by which any of said indicators may be put into driven connection with any of said eccentric elements.

35. In a calculating apparatus, a series of release members representing the several digits, a driving shaft, eccentrics corresponding to the several release members, each temporarily engageable with said shaft and adapted to give a back-and-forth movement proportional to the value of the number which it represents, indicators, intermediate connections for transmitting the movement of said eccentrics to said indicators, a toothed wheel fixed to the shaft adjacent each eccentric, a locking dog connected to each eccentric, a fixed stop and a movable escapement normally holding said dog out of engagement with its adjacent wheel and disengaging the same and stopping the eccentric after each complete rotation thereof, and connections by which said release members displace the escapements of their respective eccentrics and stops.

36. In a calculating apparatus, a driven shaft, a toothed wheel secured thereto, a rotary driven member loose with respect to said shaft, a dog carried with said driven member, yielding means tending normally to bring said dog into connection with the teeth of said wheel, a plurality of projections attached to said dog and extending from opposite sides of the pivotal axis thereof, and stops adapted to be in engagement with said projection simultaneously for holding the dog out of engagement with the wheel and preventing rotation of the driven member, one of said stops being displaceable to release its engaged projection.

37. In a calculating apparatus, a driven shaft, a toothed wheel secured thereto, a rotary driven member loose with respect to said shaft, a dog carried with said driven member, yielding means tending normally to bring said dog into connection with the teeth of said wheel, said dog having projections extending from opposite sides of its pivotal axis, a fixed abutment in the path of revolution of one of said projections, and a movable escape abutment adapted to be brought into and out of the path of revolution of the other projection, whereby the dog may be permitted to lock the eccentric to the wheel and may subsequently be released therefrom and brought to a stop.

38. In a calculating apparatus, a driven shaft, a toothed wheel secured thereto, a rotary driven member loose with respect to said shaft, a dog carried with said driven member, yielding means tending normally to bring said dog into connection with the teeth of said wheel, said dog having projections extending from opposite sides of its pivotal axis, a fixed abutment in the path of revolution of one of said projections, and a movable escape abutment having two lugs or pallets each adapted to be brought into and out of the path of revolution of the other projection with a space between them to permit escape of said latter projection, their range and limits of movement being such that when one is moved out of such path the other comes into the path, whereby the dog may be permitted to lock the eccentric to the wheel and may subsequently be released therefrom and brought to a stop after a single revolution of the shaft and eccentric.

39. In combination with a typewriting machine, the number keys, and the paper carriage thereof, a calculating apparatus comprising a driver, a series of result indicators, elements corresponding in number to said number keys connectible with said driver and with said indicators and constructed to actuate the latter by varying amounts proportional to the numerical values of their respective number keys, a stop motion mechanism for each said element operable through intermediate connections by its respective number key to cause a single actuation of the element of the driver, and means controlled by the position of said carriage for preventing operation of said stop motion mechanism at certain times.

40. In combination with a typewriting machine, the number keys, and the paper carriage thereof, a calculating apparatus comprising a driver, a series of result indicators, elements corresponding in number to said number keys connectible with said driver and with said indicators and constructed to actuate the latter by varying amounts proportional to the numerical values of their respective number keys, intermediate connections through which depression of any number key causes its corresponding element to be operated by the driver, and means for disabling said intermediate connections to prevent actuation of the calculating mechanism when the keys are operated at certain times.

41. In combination with a typewriting machine, the number keys, and the paper carriage thereof, a calculating apparatus comprising a driver, a series of result indicators, elements corresponding in number to said number keys connectible with said driver and with said indicators and constructed to actuate the latter by varying amounts proportional to the numerical values of their respective number keys, intermediate connections through which depression of any number key causes its corresponding element to be operated by the driver, and means controlled by the position of the carriage in its regular travel for disabling said intermediate connections and preventing actuation of the calculating mechanism by the keys when certain portions of the carriage are in position to receive type impressions.

42. In combination with a typewriting machine, the number keys, the shift key, and the paper carriage thereof, a calculating apparatus comprising a driver, a series of result indicators, elements corresponding in number to said number keys connectible with said driver and with said indicators and constructed to actuate the latter by varying amounts proportional to the numerical values of their respective number keys, intermediate connections through which depression of any number key causes its corresponding element to be operated by the driver, and means operated by the shift key to render said intermediate connections inoperative when the typewriting machine is set for writing "upper case" characters.

43. In combination with a typewriting machine, its number keys and its carriage, a calculating mechanism having result indicators, an actuator for each indicator, and means controlled by said number keys for moving said actuators, said means being normally disconnected from the actuators, a displaceable abutment mounted on each actuator movable into position to be engaged by said means, and selecting devices operable by the travel of said carriage for thus moving the said abutments.

44. In combination with a typewriting machine, its carriage, its number keys, calculating indicators, an actuator for each of said indicators, and means under the control of the number keys for moving said actuators varying amounts, detents for detachably engaging the various actuators with said means, and a series of selectors rotatably mounted for engaging said detents successively with said means and driven by said carriage in its travel.

45. In combination with a typewriting machine, its carriage, its number keys, calculating indicators, an actuator for each of said indicators, and means under the control of the number keys for moving said actuators varying amounts, detents for detachably engaging the various actuators with said means, a series of selectors rotatably mounted for engaging said detents successively with said means, an oscillating driver for said selectors, and a cam by which said driver is operated, said cam being spring operated and governed by the travel of the carriage.

46. In combination with a typewriting machine, its carriage, its number keys, calculating indicators, an actuator for each of said indicators, and means under the control of the number keys for moving said actuators varying amounts, detents for detachably engaging the various actuators with said means, a series of projections rotatably mounted for engaging said detents successively with said means, a cam by which said projections are driven, a driver for said cam connected with said carriage and governed in its movement by the travel of the latter, and a connector between said cam and driver adapted to connect them together in a variety of positions, whereby the indicators may be actuated when the carriage is in certain predetermined positions.

47. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members operated under the control of the carriage for causing the indicators to be successively put into condition for operation as the carriage travels.

48. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, a cam rotated step by step under the control of the carriage, and driving connections between said cam and selectors for operating the latter as the carriage travels.

49. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, and a cam rotated step by step under the control of the carriage, connected for operating said selectors successively, said cam being operative for this purpose during a part only of its rotation, whereby the indicators may be operated only when a certain part of the carriage is in position to receive type impressions.

50. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, and a cam rotated step by step under the control of the carriage, connected for operating said selectors successively, said cam being operative for this purpose during a part only of its rotation, whereby the indicators may be operated only when a certain part of the carriage is in position to receive type impressions, and being adjustable in its relation with the carriage to permit the operator to determine the location which the carriage will occupy when the indicators are operable.

51. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, a cam having a groove in its side, portions of which are concentric and therefore inoperative to produce motion, and an intermediate portion which is of constantly varying radius, an arm having a stud held in said groove, gearing moved by said arm for operating the selectors, and means governed by the carriage for rotating said cam step-by-step in synchronism with the travel of the carriage.

52. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, a disk cam having a groove in its side, consisting of inner and outer circular portions concentric with the cam and an intermediate non-circular connecting portion, a stud contained in said groove and moved by the non-circular portion thereof, connections operated by movement of said stud for driving the selectors to connect the indicator actuators successively with the said driving members, and a driver for said cam controlled by the carriage so as to move the cam synchronously therewith.

53. In combination with a typewriting machine, the number keys and the carriage thereof, a calculating apparatus including result indicators, actuators directly operating said indicators, driving members operable under the control of said number keys for moving said actuators but normally disconnected therefrom, selectors for putting said actuators into connection with said driving members, a disk cam having a groove in its side, consisting of inner and outer circular portions concentric with the cam and an intermediate non-circular connecting portion, a stud contained in said groove and moved by the non-circular portion thereof, connections operated by movement of said stud for driving the selectors to connect the indicator actuators successively with the said driving members, and a driver for said cam controlled by the carriage so as to move the cam synchronously therewith, said cam being adjustable with relation to its driver so as to alter the point in the travel of the carriage where the non-circular portion of the cam groove becomes operative.

54. In an apparatus of the character described, the combination of a cam, a rotary driver loosely arranged with respect to said cam, a typewriter carriage, a connecting element by which said driver is caused to rotate synchronously with the travel of the carriage, and locking means between said driver and cam for connecting the latter to the former in any one of a variety of positions.

55. In an apparatus of the character described, the combination of a cam, a rotary driver loosely arranged with respect to said cam, a typewriter carriage, a connecting element by which said driver is caused to rotate synchronously with the travel of the carriage, and locking means between said driver and cam for connecting the latter to the former in as many relative positions as there are positions of rest for the carriage during its travel, whereby the cam may commence to be operative in any position of the carriage.

56. In an apparatus of the character described, the combination of a cam, a rotary driver loosely arranged with respect to said cam, a typewriter carriage, a spring for moving the carriage, a connecting element by which said driver is caused to rotate synchronously with the travel of the carriage, locking means between said driver and cam for connecting the latter to the former in any one of a variety of positions, and a spring for rotating said driver, said latter spring being caused to exert its force in the same direction as does the carriage spring, whereby the carriage spring is relieved from additional duty.

57. In an apparatus of the character described, the combination of a cam, a rotary driver loosely arranged with respect to said cam, a typewriter carriage, a connecting element by which said driver is caused to rotate synchronously with the travel of the carriage, locking means between said driver and cam for connecting the latter to the former in as many relative positions as there are positions of rest for the carriage during its travel, whereby the cam may commence to be operative in any position of the carriage, and a stop for arresting motion of the cam relative to the driver when the cam is in a position to commence operation.

58. In a calculating apparatus, a series of manually-operated controllers, a series of indicators, bars for operating said indicators, a driver for retracting said bars without operation of the indicators, means controlled by the several manually-operated controllers for moving said driver varying distances proportional to the nine digits, springs for advancing the bars to operate the indicators, stops normally arresting the advance of said bars but displaceable to permit further motion thereof for carrying tens, and means for retracting the bars through a distance equal to such further advance before subsequent actuation of one of said controllers.

59. In a calculating apparatus, a series of manually-operated controllers, a series of indicators, bars for operating said indicators, a driver for retracting said bars without operation of the indicators, means controlled by the several said controllers for moving said driver varying distances proportional to the nine digits and automatically driven through one cycle of motions at each actuation of an actuator, being then brought to rest, springs for advancing the bars to operate the indicators, stops normally arresting the advance of said bars but displaceable to permit further motion thereof for carrying tens, and connections operated by said means at the conclusion of their cycle of movements connectible with said bars for restoring them to normal position after having been thus further advanced and prior to subsequent actuation of any of said controllers.

60. In a calculating apparatus, a plurality of manually-operated control devices representing the nine digits, a plurality of result indicators, reciprocating bars for actuating said indicators, a driver or actuator, connectible with said bars for moving them in one direction varying distances proportional to the nine digits, driving elements under the control of the several manually operated controllers for giving the required movement to said driver, springs constantly tending to advance said bars to drive the indicators, displaceable stops for normally preventing overthrow of said bars and permitting sufficient excess motion to carry tens, a rock shaft having arms adapted to engage said bars, and connections operated by said driving elements at the conclusion of their driving movement for rocking said shaft and arms to restore the bars to normal position.

61. In a calculating apparatus, a plurality of manually-operated control devices representing the nine digits, a plurality of result indicators, reciprocating bars for actuating said indicators, a driver or actuator connectible with said bars for moving them in one direction varying distances proportional to the nine digits, a driving shaft, rotary driving elements connectible with said shaft upon actuation of said controllers for giving the required movement to said driver, and disconnectible from the shaft after conclusion of a complete rotation, springs constantly tending to advance said bars to drive the indicators, displaceable stops for normally preventing overthrow of said bars and permitting sufficient excess motion to carry tens, a rock shaft having arms adapted to engage said bars, cam elements carried by said driving elements, a second rock shaft, arms extending therefrom in position to be engaged and rocked by said cam elements at the end of their movement, and connections between said rock shafts whereby the second rocks the first, and the arms carried thereby, to restore the bars to normal position.

62. In combination with a typewriting machine having number keys, normal levers by which said keys are carried, a calculating mechanism having control levers, each arranged to be depressed by depression of a number key, and means for preventing return of a lever before the number key has been depressed sufficiently to typewrite a figure.

63. In combination with a typewriting machine having number keys, a calculating mechanism having release or control levers, each arranged to be depressed by depression of a number key, and means for preventing return of a lever before the number key has been depressed sufficiently to typewrite a figure, said means consisting of a frictional dog engaging a surface of said lever and held in engagement with such surface until the limit of its movement has been reached.

64. In combination with a typewriting machine having number keys, a calculating mechanism having control levers, each arranged to be depressed by depression of a number key, a pivoted pawl having a cam surface bearing on a surface of each said lever so as to permit operating movement and prevent return thereof, and a shoulder on each said lever arranged to displace said pawl when the lever has reached the limit of its depression whereby the lever is then permitted to return only after it has been depressed sufficiently to permit impression of a figure by the corresponding number key, said levers having portions extending above the plane of the bottom of the typewriting machine to be directly actuated by the normal key levers of said machine.

65. In combination with a typewriting machine having number keys, a paper carriage, a calculating mechanism having release levers, each arranged to be depressed by depression of a number key, and means for absolutely preventing depression of said levers and number keys in certain positions of the carriage.

66. In combination with a typewriting machine having number keys, a paper carriage, a calculating mechanism having release levers, each arranged to be depressed by depression of a number key, each having a slot, a bar mounted so as to swing and be embraced by the slot of any of said levers when the latter are depressed, and a detent controlled by the position of the carriage for locking said bar in a position to obstruct the depression of said levers, whereby actuation of the calculating mechanism is prevented when the carriage is in certain positions.

67. In combination with a typewriting machine having number keys, a paper carriage, a calculating mechanism having release levers, each arranged to be depressed by depression of a number key, a movable bar, and a detent controlled by the position of the carriage for locking said bar in a position to obstruct the depression of said levers, whereby actuation of the calculating mechanism is prevented when the carriage is in certain positions.

68. In combination with a typewriting machine having number keys, a paper carriage, a calculating mechanism having release levers, each arranged to be depressed by depression of a number key, a movable bar normally free to swing and be displaced when engaged by said levers in their depression, a detent adapted to lock said bar in position to obstruct the levers, and a cam for operating said detent so as to lock the bar in such manner, said cam being driven under the control of the carriage, whereby the levers are restrained from actuating movement when the carriage is in certain positions.

69. In a calculating mechanism, result indicators, reciprocating bars for driving said indicators, yielding elements constantly tending to give driving movement to the bars, a device for resetting said indicators to zero, and restraining means for preventing advance movement of said bars while the indicators are being so reset.

70. In a calculating mechanism, result indicators, reciprocating bars for driving said indicators, yielding elements constantly tending to give driving movement to the bars, stops for preventing excess movement of said bars, means for displacing said stops when the indicators pass into the zero position, to permit further movement of the bars to carry tens, a device for resetting said indicators to zero, and restraining means for preventing advance movement of said bars while the indicators are being so reset.

71. In a calculating mechanism, result indicators, reciprocating bars for driving said indicators, yielding elements constantly tending to give driving movement to the bars, stops for preventing excess movement of said bars, means for displacing said stops when the indicators pass into the zero position, to permit further movement of the bars to carry tens, a device for resetting said indicators to zero, and restraining means for preventing advance movement of said bars while the indicators are being so reset, said restraining means consisting of a rock shaft having arms adjacent the bars, pins on the bars, and a handle for rocking said shaft and bringing the said arms where they will stop advance of the bars.

72. The combination with a calculating apparatus having totalizing indicators remaining continuously in the same place, and having a rotary selector for determining which indicator shall be operated, also remaining continuously in the same location, of a typewriting machine having a movable paper carriage, and a flexible connection between said paper carriage and the selector for controlling the selector according to the lateral position of the paper carriage.

73. A calculating mechanism including in combination numeral indicators, pinions connected to said indicators, toothed actuators, and a toothed setting bar for placing the indicators in zero position, the actuators and setting bar being adapted to engage the same pinions.

74. A calculating mechanism including in combination numeral indicators, pinions connected to said indicators, toothed actuators, and a toothed setting bar for placing the indicators in zero position, the actuators and setting bar being adapted to engage the same pinions, the actuator being yieldingly mounted to permit movement of the indicators when so moved by said setting bar.

75. A calculating mechanism including in combination numeral indicators, pinions connected to said indicators, toothed actuators, and a toothed setting bar for placing the indicators in zero position, the actuators and setting bar being adapted to engage the same pinions, the actuator being yieldingly mounted to permit movement of the indicators when so moved by said setting bar, and the setting bar having recesses normally lying beside the several pinions to permit movement of the latter when impelled by the actuators, without interference by the setting bar.

In testimony whereof we have affixed our signatures, in presence of two witnesses.

EDWARD H. PALMER.
CLARENCE T. BERRY.

Witnesses:
ARTHUR H. BROWN,
P. W. PEZZETTI.

Copies of this patent may be obtained for five cents each, by addressing the "Commissionei of Patents, Washington, D. C."